United States Patent [19]

Giles et al.

[11] Patent Number: 4,823,268

[45] Date of Patent: Apr. 18, 1989

[54] METHOD AND APPARATUS FOR TARGET PLANT FOLIAGE SENSING AND MAPPING AND RELATED MATERIALS APPLICATION CONTROL

[75] Inventors: Durham K. Giles; Michael J. Delwiche, both of Davis, Calif.; Roy B. Dodd, West Union, S.C.

[73] Assignee: Clemson University, Clemson, S.C.

[21] Appl. No.: 66,137

[22] Filed: Jun. 23, 1987

[51] Int. Cl.$^4$ ............................ G06F 15/14; B05B 9/06
[52] U.S. Cl. .................................. 364/424.07; 239/77
[58] Field of Search .................... 364/424.01, 424.07; 239/77, 78; 47/1.5, 1.7, 2; 118/323, 679, 684

[56] References Cited

U.S. PATENT DOCUMENTS 4,078,365 3/1978 Ingalls ............................... 239/78 X
4,768,713 9/1988 Roper .................................... 239/77

FOREIGN PATENT DOCUMENTS 454013 4/1975 U.S.S.R. .

OTHER PUBLICATIONS

Four (4) page color brochure of DjSC1000 Sprayer Control by Dickey-john Corp., Auburn, Illinois (undated).
Final Draft of Chapter II "Review of Literature" of Doctoral Discertation by Durham Kennemer Giles, May, 1987, entitled "Control of Orchard Spraying Based on Electronic Sensing of Spray Target Characteristics".
"Electronic Sensing of Plant Canopy Volume" by Giles et al., American Society of Agriculture Engineers Paper No. 86-1087, Jun. 29, 1986–Jul. 2, 1986.
"Electronic Measurement of Tree-Row-Volume" by McConnell et al., Agricultural Electronics, vol. I, pp. 85-90, 1983, ASAE, St. Joseph, Michigan.
Various magazine articles dated Jul. 1984 to Sep. 1985 from "The Citrus Industry" and other materials relative a spray system by Roper Growers Cooperative, Winter Garden, Florida.
"Ultrasonic Ranging System" owners manual by Polaroid Corporation for Ultrasonic Transducer Model 604142 and Ultrasonic Ranging Board Model 607089.
Polaroid Ultrasonic Ranging System Handbook for Polaroid Corporation Ultrasonic Transducers and associated Ranging Boards.
"Home In On The Range!; an Ultrasonic Ranging System" by Steve Ciarcia, BYTE Publications, Nov. 1980, pp. 32, 34, 36, 38, 42, 46, 48, 50, 52, 56, and 58.
"An Ultrasonic Ranging System" by Steve Ciarcia, BYTE Publications, Oct. 1984, pp. 112 through 123.

*Primary Examiner*—David Mis
*Attorney, Agent, or Firm*—Dority & Manning

[57] ABSTRACT

An electronic orchard tree measuring system based on ultrasonic range transducers may be used to determine the amount and vertical distribution of sensed load centroids in vertical sectors of orchard trees. The ultrasonic transducers may be operated independently of any processor or memory which receives their distance data outputs. Displacement sensing of the apparatus relative a row of target trees may instead be used to select ultrasonic distance data at predetermined incremental distances of travel relative the trees being sensed. Thus, the most recent value of sensed data is always available as input to the processor or memory, without requiring any timing circuitry between such sensing and control circuits. The detection data may be stored in memory for subsequent processing to create a map of foliar volumes of the sensed target trees. Alternatively, the spatial characteristics of the sensed amount and vertical distribution of load centroids for a given vertical segment of target trees may be further compared spatially with determined application patterns of controllable spray nozzles to configure subsequent activation of such nozzles for optimal material application to the given vertical segment of the sensed target trees.

39 Claims, 9 Drawing Sheets

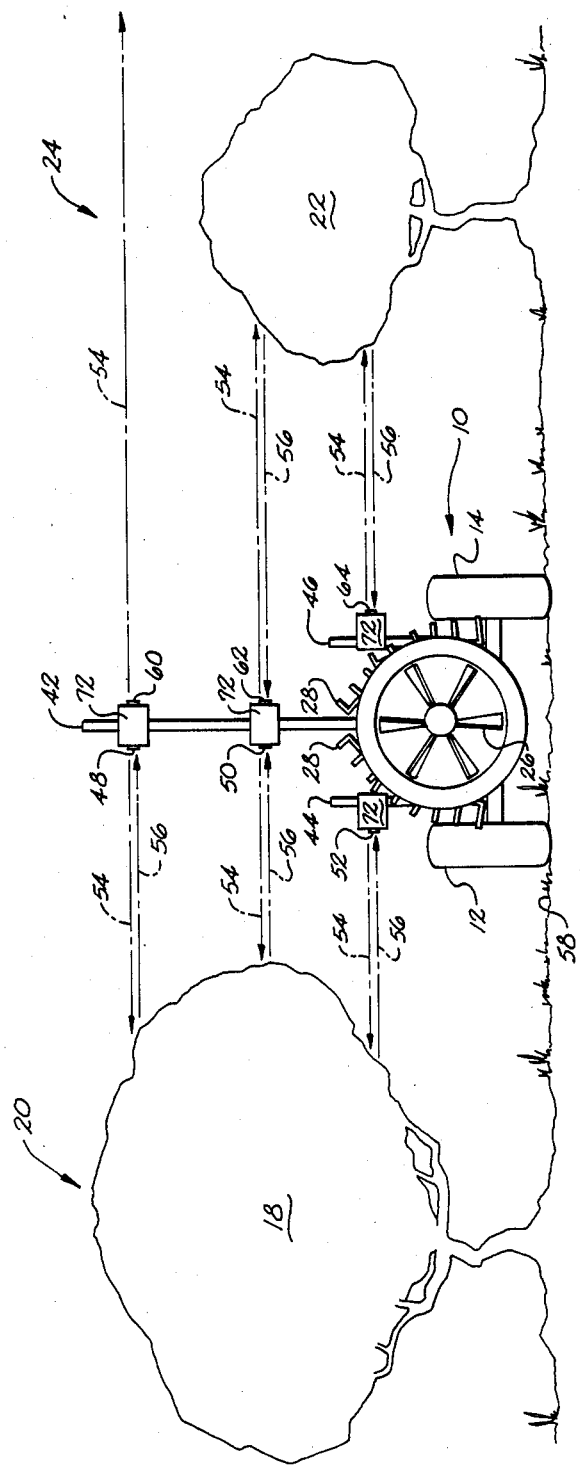

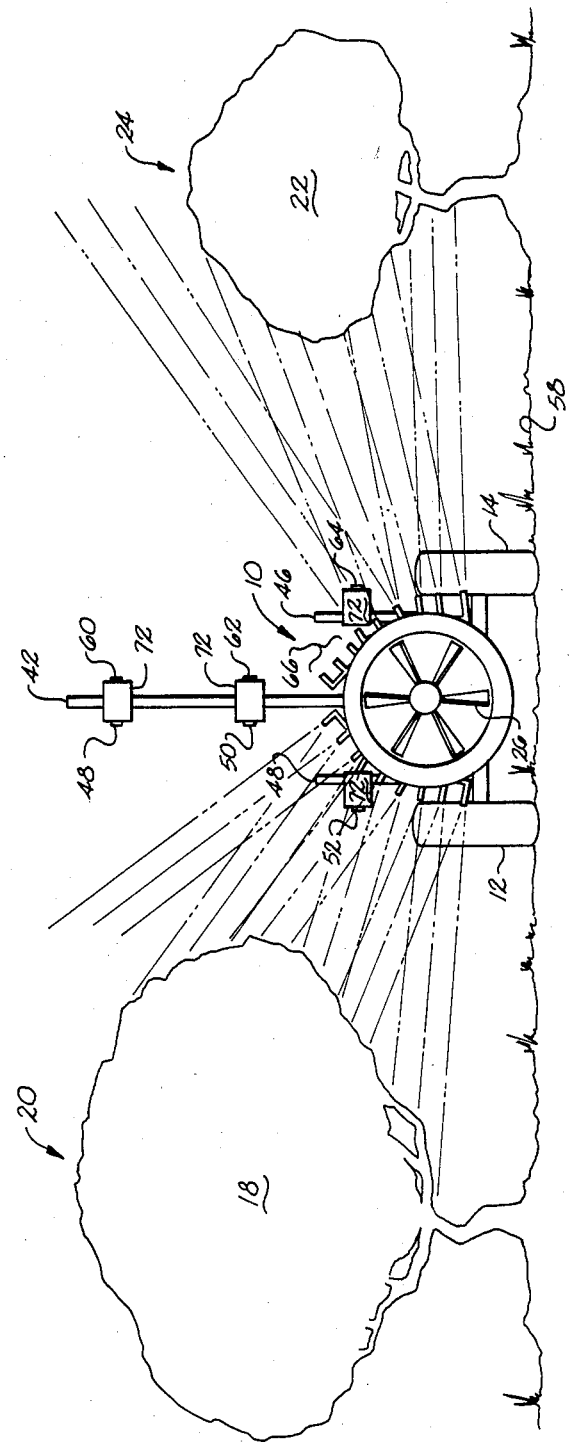

METHOD AND APPARATUS FOR TARGET PLANT FOLIAGE SENSING AND MAPPING AND RELATED MATERIALS APPLICATION CONTROL

BACKGROUND OF THE INVENTION

This invention in general concerns improved method and apparatus for determining physical characteristics of plants, and in particular concerns mapping of a plurality of foliar volumes situated in a given orientation such as in the case of orchard trees. Further aspects of the invention concern method and apparatus for controlling the application of various materials based on the detected plant characteristics.

Modern agricultural methods have introduced the use of a variety of practices resulting in products of both improved quality and increased quantity, i.e. yield. While some of such practices generally concern the area of land management (for example, the control of land erosion and soil misuse through particular planting and cultivation regimens), others have been generally concerned with the application of various materials to the soil and/or the in-ground crops. For example, various soil enhancers such as granular fertilizers, limes, and other products may be used particularly during early stages of plant development to promote initial growth in the plants. As plants grow and mature, other types of materials, such as liquid chemicals may be applied to the plant surfaces for controlling plant diseases and for eradicating pests from the crops.

One example of cultivated crops which commonly receive considerable application of various chemical products is in the area of orchard trees. Orchards are conventionally arranged in equidistant rows of trees, with sufficient room between such rows for tractor-drawn sprayers, harvesters, and the like. Throughout the productive life of such trees, the spaces between the rows may be used to provide access for equipment to initially plant and fertilize the trees, later spray the trees, and ultimately harvest their production.

While modernization has unquestionably resulted in tremendous strides in agricultural production, the ever-increasing cost of such practices and constraints thereon (such as government controls concerning the use of agricultural chemicals) have been cause for considerable research directed towards improving the efficiency of agricultural material application, particularly liquid chemical application. Various plant and animal science efforts (such as in the specific fields of agronomy, entomology, and horticulture) have led to the production of advanced materials and improved chemical control methods. However, the essential mechanics of actually applying such chemicals onto target crops continues to remain as primarily engineering problems.

The primary task of an ideal or optimal spraying system is to deliver uniformly and exclusively to a target area a precise specified amount of material. Such object is less of an engineering problem in "perfect" environments, i.e. where the target morphologies are well defined and non-variable. An industrial spray system (for example, successive painting of identically-shaped objects) can be controlled to achieve optimal performance, that is where essentially all material discharged reaches a desired target.

Unlike tightly-controlled industrial spray applications, agricultural spray systems must operate in highly adverse environments where the target geometries are poorly defined, as well as being highly variable. In many instances, the application rate of a given system is merely set at the start of a spraying season and left unchanged. Such an approach has the obvious drawback that the effective application rate of the material varies (uncontrollably) due to normal plant growth or simply due to variations within a given field. Target areas more dense than the nominal density corresponding with the selected application rate are under-applied with the subject materials; conversely, target areas less dense than the nominal density receive an excess application of material.

Particularly in the area of pest control chemicals, an operator may seek to maintain control in an entire target region by selecting the nominal application rate based on the most dense target areas thereof. Such practice obviously leads to even greater over-application of pest control chemicals, thereby increasing both the chemical product and application cost to the producer, while further introducing excess chemicals into the environment with virtually no benefit.

Various sprayer control systems have been developed which attempt to improve over-all efficiency of chemical application by adjusting sprayer outputs based on sensed target crop characteristics. For example, one type of commercially available control system adjusts spray output based on ground speed variations of the sprayer. However, since no characteristics of the crops themselves are sensed in such systems, a necessary assumption is made that the crop area is homogeneous across the spray area. Such assumption would rarely if ever be accurate for many applications.

Yet another type of sprayer control system senses the presence of target plants or crops, and activates the spray output accordingly. Such control systems physically detect the presence of target plants using various probes and intermittently control the spray systems responsive to probe results. A system made by the Roper Growers Cooperative, of Winter Garden, Fla., activates spray nozzles in different vertical zones based on ultrasonic sensing of the presence of trees in corresponding vertical sensing zones. Essentially, the height of a given target tree is estimated with a plurality of vertical sensors, and then used to control turn-on of the corresponding manifold segments.

Efficient spray control for orchard crops is particularly difficult to achieve in comparison with row crop chemical application because the orchard target areas are often significant distances away from sprayer outlets. In row crops, spray nozzles may be cantilevered with a horizontal boom to project over the crops and point literally directly down thereon at close range.

Furthermore, for a given unit of land area, orchard crops have much larger volumes of foliage (i.e. target areas) than relatively smaller row crops. Also, such foliage volume can considerably vary in both height and width characteristics of target crops, thereby presenting rigorous criteria for an optimal application orchard sprayer control system. Due to such considerable variation in target volumes, this invention recognizes that a system approaching an actual measurement of the amount of target foliage present is a highly desireable basis for sprayer control.

Another approach to sensing target trees was set forth in a proposal by McConnell et al. (1983) based on research efforts conducted at the West Virginia University. It was proposed by McConnell et al. that a vertical mast of ultrasonic range transducers could be used to measure and record tree extension outward from the tree trunk. By using a plurality of vertically-displaced sensors, a vertical scan could be obtained and used to estimate the tree foliage volume. While no laboratory or field tests were conducted by McConnell et al., they theorized that such tree foliage volume estimates could be applied as a management tool for possible growth monitoring of an entire tree row or even a given block of trees, as well as for production predictions.

It was also theorized that the tree foliage volume estimates could be used to adjust chemical application rates, although concerns were expressed over how such theory could be applied to an actual practical system. One concern was that ultrasonic beam pattern divergence would lead to unacceptable performance levels, while overall system timing and data storage would be additional sources of practical problems. In particular, McConnell et al. proposed to accomplish vertical scanning under the control of a computer, and store echo data in the computer's memory. Even McConnell et al. recognized drawbacks of their proposed computer-directed detection system by calculating an upper limit on tractor speed of 1.2 meters per second, based on scan time of the transducers in consideration of internal set-up time of his proposed pulse generation electronics, and the rate at which the computer could direct and handle the overall operation and make necessary calculations. Without offering any further solutions to these drawbacks, McConnell flatly stated that parallel measurements are necessary to obtain either faster data gathering speed or greater detection resolution. It was further specifically concluded that the ultrasonic ranging system presented a challenging problem because the ultrasonic transducers which were utilized (which were commercially available from Polaroid Corporation) were not adequate for use in their theorized system.

The general purpose of simple intermittent or other more sophisticated spray application control systems is to eliminate at least a portion of the excessive or over-applied materials. However, another problem faced by growers (particularly large orchard producers) concerns excess un-applied materials. Typically, an air-blast type orchard sprayer includes a 300–500 gallon tank, in which an active chemical ingredient is pre-mixed with water or some other carrier for application to target trees. Any unused portion of the tank contents often must be disposed of in accordance with environmental hazardous waste disposal requirements, for example such as specialized burying of remaining products.

One proposed alternative involves a concept known as direct injection, in which the spray carrier (e.g. water) and the active chemical ingredient are kept separated until immediately before entry into the spray nozzle, which can greatly reduce (if not eliminate) the excess pre-mixed spray which is subject to waste and environmental hazard disposal requirements. However, this proposed concept has not been effectively applied in the field because various systems for attempted practice of the concept have proven problematic. For example, one known metering injection pump (for the active ingredient) has been determined to have relatively lengthy inherent time delays (such as 4.8 to 16.1 seconds) associated with the variable concentration control system between the initiation of metering pump adjustment and the attainment of an acceptable spray concentration error (for example, less than 10%). At 6.4 km/hr., from 8.8 to 28.7 meters would be covered by the sprayer during such time delay period. Thus, the concept of direct injection has not been used to full benefit, and has not generally heretofore been attempted with systems where target morphology information was directly sensed.

Yet another problem concerning the development of practical orchard spraying systems for optimal application of chemicals is linked with the air-blast type of sprayers themselves frequently used for orchard spraying. In contrast, row crop spraying normally results in droplet deposition downward onto the target. However, in air-blast spraying, the pesticide droplets are entrained in high-velocity, high-volume air-jets, with resulting droplet transport mechanics differing greatly from the well-understood and relatively simple mechanics of row crop spraying. Additionally, as mentioned above, the distance between target areas and sprayer outlets in orchard spraying is usually increased, which correspondingly increases the probability of droplet evaporation or drift from the target area. Such complexity of droplet transport geometry, combined with the ever-present variability of ambient wind velocity, relative humidity and temperature, makes theoretical analysis of orchard spraying very difficult. Accordingly, relatively little theoretical information is available relative air-blast sprayer deposition which could be usefully incorporated into design criteria for an orchard sprayer for optimal application.

In addition to the foregoing practical engineering and theoretical difficulties as well as hazardous waste constraints, the economic perspective of orchard spraying suggests the considerable need for optimal application of chemicals. Studies of the costs of chemical applications (including material, equipment, and labor) have been estimated to represent over 50% of the total production cost for some orchard crops, such as peaches and apples. Not only would provision of an optimal chemical application method and system obviously reduce the cost of spray materials, but a reduction in the volume of applied chemicals would result in each load of material in the sprayer covering an increased orchard area. Presently, much time is consumed in traveling to a supply area to refill a sprayer. Thus, a corresponding decrease in the amount of such time would result in a reduction in equipment and labor costs associated with spraying.

SUMMARY OF THE INVENTION

The present invention recognizes and addresses the above-noted drawbacks and shortcomings as well as others of previous methods and systems. Accordingly, it is a general object of the present invention to provide an improved method and apparatus for sensing crop morphologies, such as foliar volumes of orchard trees arranged in equidistant rows. It is still another general object of the present invention to provide methods and systems for optimally controlling application of materials to such sensed target crops.

It is a more particular object of this invention to provide a foliage measurement method and system for obtaining foliar target volume estimates for either mapping growth patterns and the like for subjects crops, or further for controlling the application of various materials (e.g. pesticides, fertilizers, etc.) thereto. It is another more particular object of this invention to provide such a method and system for a sprayer-mounted control system particularly adapted for orchard spraying based on the sensed spatial characteristics of target volumes, i.e. the determined size and location of target centroids, relative the determined spray deposition patterns of various spray nozzles of the orchard sprayer.

Concepts of this invention are equally applicable for retrofitting an existing sprayer or originally outfitting a new sprayer.

Thus, it is another general object of the present invention to permit modification of existing devices, such as air-blast sprayers, to permit on-board control of their spray output, particularly based on target sensing as disclosed herewith. It is also a general object of this invention to provide an integrated method and system of sensing crop morphology in the improved manner disclosed herewith and controlling spray output in the improved manner also disclosed herewith, thereby providing a complete orchard sprayer target-based control system.

It is yet another object of this invention to provide such an orchard sprayer target-based control system which is field tested for documented acceptable system performance.

In consideration of both economic concerns and environmental concerns, it is a general object of the present invention to provide an improved orchard spraying method and system which results in spray volume savings over and above simple intermittent control systems. Additionally, and particularly with respect to the hazardous waste considerations mentioned above, it is an object of this invention to provide an orchard spraying control method and apparatus which renders practical the use of direct injection concepts by which the spray carrier and active ingredient may be kept separated until immediately before they are to be sprayed.

In achieving an improved sprayer system which obtains optimal application by determining desirable spray blast orientation in accordance with the relative spatial distribution of target foliar volume to the position of the sprayer, it is one initial object and aspect of this invention to provide an improved electronic sensing system adapted for use with such a control system. In general, in accordance with one aspect of the invention, a target foliar volume measurement system may be provided which is based on commercially available ultrasonic range transducers, interfaced to a digital computer via particular circuitry disclosed herein. In one embodiment, an array of plural transducers mounted on a vertical mast positioned on a sprayer drawn by tractors between rows of orchard trees may be used to measure the distance from the transducers out to the nearest tree foliage at the various vertical elevations. More particularly with respect to the subject control system, nozzle manifolds of such sprayer may be controlled in various segmented portions so as to provide optimal application of spray materials, based on size and location of sensed target centroids compared with a defined standard tree, and based on the spatial relationship of such target centroids relative determined spray patterns of the segmented nozzles.

While various particular exemplary embodiments of the present invention, including both method and apparatus, are disclosed herewith, one exemplary apparatus for obtaining distance data between the apparatus and plurality of target tree aligned in a row, while being transported past those trees, comprises: distance determining means for independently operating in cycles to sense respectively the distances between different vertical locations on such apparatus and the nearest tree foliage therefrom of a target tree situated in a row of such trees along which such apparatus is transported, and for providing respective distance data outputs corresponding with each of the different vertical locations, which outputs are updated for each cycle of distance determining means operation; transport displacement sensing means for outputting an incremental distance signal indicative of the apparatus being transported a predetermined incremental distance relative a row of target trees; and data storage means, adapted to receive the respective distance data outputs and the incremental distance signal, for orderly storing of the respective distance data outputs for the respective current cycle of distance determining means operation occurring at the time of each incremental distance signal, whereby such orderly stored data outputs may be subsequently processed with respect to the predetermined incremental distance to obtain profiles of foliar volumes for a plurality of sensed target trees.

An exemplary method generally corresponding with such apparatus and in accordance with the present invention concerns a method for obtaining distance data between an apparatus and a plurality of target trees aligned in a row, the method comprising the steps of: providing an apparatus with a plurality of distance determining means situated at discrete vertical locations thereon for sensing the distance between such locations and the nearest tree foliage therefrom of a target tree situated in a row of such trees; transporting such apparatus along such row of target trees; independently operating such distance determining means in repetitive common cycles to sense the distances between their respective vertical locations and the nearest tree foliage therefrom; producing respective distance data outputs corresponding with sensed distances for each of the locations, such outputs being updated for each cycle of distance determining means operation; detecting each time the apparatus is transported a predetermined incremental distance relative the row of target trees; and orderly storing the respective distance data outputs for the respective current cycle of distance determining means operation occurring each time the apparatus is transported the predetermined incremental distance, whereby such orderly stored data outputs may be subsequently processed with respect to the predetermined incremental distance to obtain profiles of foliar volumes for a plurality of such sensed target trees.

Yet another exemplary embodiment of an apparatus in accordance with this invention adapted for controlling the application of select materials to respective target trees arranged in generally regular, equidistant rows forming an orchard, comprises: a mobile unit adapted to be conveyed between adjacent rows of such target trees along a travel path generally parallel to such rows and equidistant therebetween, the mobile unit including holding means supported thereon for holding materials to be controllably applied to such target trees; mobile unit displacement sensor means for detecting a predetermined incremental displacement of the mobile unit relative the rows of target trees, and for outputting an incremental movement signal indicative thereof; a plurality of individually controllable material distribution means, supported on the mobile unit for movement therewith, for outputting materials fed thereto from such holding means towards target trees situated generally laterally from the axis of the travel path for such mobile unit, each of the distribution means having a generally determinable material distribution pattern, the spatial characteristics of which differ for each distribution means and which vary depending on the distance outward from the respective distribution means; a plurality of ultrasonic distance detection means, situated at predetermined respective vertical heights on the mobile unit and forwardly thereon relative the material distribution means with respect to the direction of travel of the mobile unit, for being operated in common measurement cycles to output for each such cycle a set of respective distance data signals indicative of a pulse/echo range reading of the distance between each respective ultrasonic distance detection means and the nearest target tree foliage generally outward therefrom; and material distribution means control means, operatively associated with each of the material distribution means for selectively and respectively actuating same, and responsive to such incremental movement signal for reading the most current measurement cycle set of respective distance data signals from the plurality of ultrasonic distance detection means, calculating relative size and vertical location of target tree centroids based on such most current set of respective distance data signals, and subsequently individually controlling actuation of each of the plurality of material distribution means for optimum material application to the sensed target trees based on the spatial relationship of the calculated target centroids to the material distribution patterns of such distribution means.

Still another exemplary construction in accordance with this invention is directed to an orchard sprayer with automatically-controlled spray function comprising: a trailer adapted to be drawn generally equidistant between adjacent rows of orchard trees having a substantially predetermined fixed spacing therebetween; a tank for holding chemicals to be applied to the orchard trees, such tank being supported on the trailer for movement therewith; pump means and hose means for pumping chemicals from the tank; a plurality of nozzles directed at respective different angles generally laterally outward from at least one common side of the trailer for spraying orchard trees along which the trailer may be drawn; an individually controllable flow valve for each of such nozzles, the hose means being connected with each of the flow valves so that actuation of a given flow valve permits passage of the chemicals to its respective nozzle; a trailer wheel rotation sensor for outputting displacement signals indicative of predetermined increments of travel of the trailer relative the orchard trees; air-blast means, associated with such nozzles for continuously outputting air under pressure therethrough, such pressurized air outputting chemicals from such nozzles in respective determined spray patterns whenever the respective flow valves of the nozzles are actuated; a plurality of ultrasonic transducers, situated on the trailer generally forward of the nozzles with respect to the axis of travel of the trailer, arranged respectively at various vertical heights relative the trailer, and directed generally outward from the common side thereof; transducer driver means for separately driving each of the transducers in a pulse/echo mode and for outputting respective measurement initiation pulse and return ultrasonic echo signal pairs for each of the transducers in a common measurement cycle thereof, ultrasonic echo signals being returned to their respective transducers as reflections from the nearest orchard tree foliage outward therefrom; clock means for providing a clock signal of predetermined frequency; digital interface means, responsive to such pulse/echo signal pairs and the clock signal, for outputting digital representations of delay times between the signal pairs which directly correspond to distances between each of the respective transducers and the nearest orchard tree foliage outwardly therefrom, such distances for each of said transducers being updated for each common measurement cycle thereof; flow valve control means, operative independently of the common measurement cycle, for responding to the displacement signals to obtain such digital distance representations of the respective transducers for the current measurement cycle thereof occurring at each predetermined increment of trailer travel, and subsequently controlling the flow valves based thereon.

Further with respect to such exemplary orchard sprayer, this invention more particularly includes means for converting the digital distance representations to foliage extension distances based on the predetermined fixed spacing between adjacent rows of the orchard trees; means for calculating the amount of relative target load based on such foliage extension distances and given standard values therefor corresponding with a defined standard tree; means for calculating the vertical distribution of the target load based on selected of such foliage extension distances and such given standard values; and means for determining a configuration of nozzles to permit the passage of chemicals thereto by actuation of their respective flow valves for preselected optimal application of chemicals to a given target load, based on the calculated relative amount and vertical distribution of such given target load; whereby the spatial relationship between spatially characterized target loads and determined chemical spray patterns for respective nozzles may be used to control respective flow valves for optimally applying chemicals to such target loads.

Still another exemplary method of this invention in accordance with further aspects thereof includes a method for controlling an orchard sprayer of the type having a plurality of separately controllable material application means, each of which have a determinable application pattern which differs from that of the others, such method comprising the steps of: determining the application patterns of such plurality of material application means; transporting the orchard sprayer along a row of target trees in an orchard; making a scan of a given vertically-oriented sector of such row of target trees to determine the relative size and vertical location of a target load centroid in such given sector; determining the distance between the target load centroid of the given vertically-oriented sector and the plurality of material application means of the orchard sprayer; and selectively actuating each of the material application means, as they are subsequently transported past the given sector, for optimal material application to the sensed load centroid in such given sector, such actuation being based on the spatial relationship between spatial characteristics of such centroid and the determined respective application patterns of the plurality of material application means, wherein the spatial characteristics of a given load centroid are defined by the respective size, location, and distance determinations thereof.

While particular exemplary embodiments, both method and apparatus, of this invention are disclosed throughout, those of ordinary skill in the art will recognize numerous variations and modifications to different aspects and elements thereof. All such modifications are intended to come within the spirit and scope of the present invention by virtue of present reference thereto.

BRIEF DESCRIPTION OF THE DRAWINGS

A complete and enabling disclosure of the present invention, including the best mode thereof, is directed to one of ordinary skill in the art in the present specification, including reference to the accompanying figures, in which:

FIGS. 2A and 2B illustrate end views of the air-blast type orchard sprayer of FIG. 1 situated generally equidistant between two rows of orchard trees to be drawn therebetween during operation of such apparatus, with sensing operations and spraying operations thereof illustrated respectively;

FIGS. 5, 5A–5G illustrate ranging timing diagrams in accordance with the present invention for use in explaining operation of an embodiment thereof;

FIGS. 11, 11A–11C represent timing signals concerning operation of the circuitry of present FIG. 10;

Figure 1:
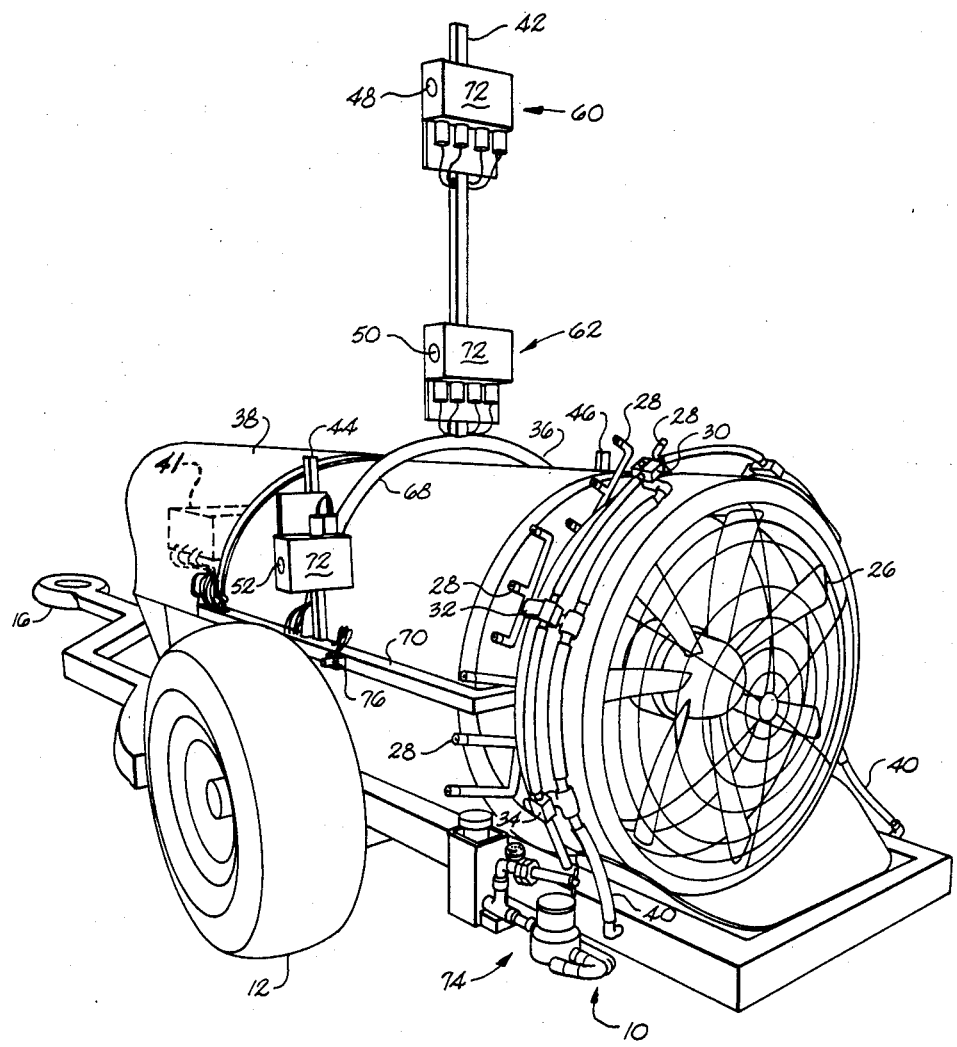
FIG. 1 illustrates a perspective view of an apparatus comprising an existing air-blast type orchard sprayer retrofitted with an exemplary system in accordance with features of the present invention, and operable in accordance with the present method.

Repeat use of reference characters, identifying terms, labels, or the like, throughout the present specification and drawings is intended to indicate same or analogous features, elements, or aspects of this invention.

DETAILED DESCRIPTION OF THE PREFERRED EMBODIMENTS

As understood from the foregoing summary of the invention, this invention concerns both method and apparatus related to sensing of target foliage volumes, and further optionally concerning control of material application means for optimally applying select materials to the sensed target foliage based on sensing thereof. While broader aspects of the present invention are fully embraced by the present disclosure, the figures herewith are more particularly concerned with specific exemplary embodiments for purposes of disclosing and describing same. Accordingly, those of ordinary skill in the art will appreciate that the full scope and breadth of the present invention is not diminished simply by presentation of specific exemplary embodiments thereof.

FIG. 1 illustrates an example of a mobile unit or trailer 10 which may be used in accordance with the present invention for practicing same. Whether used for either orderly mapping of target crop growth patterns or the like, or for further controlling a material application control system (such as a sprayer control system), an apparatus in accordance with the present invention is normally conveyed past or between rows of target crops, with equidistant rows of orchard trees constituting preferred targets for sensing. While mobile unit 10 is substantially configured in this particular example as an air-blast type orchard sprayer, broader sensing aspects (and alternative control aspects) of the present invention may be discussed in accordance with such figure without implied or express limitations thereto.

An end view of trailer 10 is also illustrated in present FIGS. 2A and 2B, with FIG. 2A being representative of sensing operations in accordance with the present invention, and with FIG. 2B being representative of optional spray control features thereof.

In general, trailer 10 may comprise a modified commercial air-blast orchard sprayer such as the Model A36-G, by F. E. Myers & Co. of Ashland, Ohio. Normally, an orchard sprayer includes at least two wheels 12 and 14 and an eyelet or similar feature 16 by which a tractor or other self-propelled unit may be used to tow trailer 10 as desired. It is generally preferred that trailer 10 be towed between adjacent rows of target trees generally parallel to and equidistant between such rows, as more particularly illustrated in present FIGS. 2A and 2B. In such manner, trees such as 18 in a predetermined row 20 thereof may be either mapped or sensed (and further optionally controllably sprayed) by structural elements defined on the side of mobile unit 10 nearest thereto, while trees 22 in a given row 24 thereof may likewise interact with mobile unit 10 on the opposite side thereof which is nearest to such row 24.

In a typical air-blast type orchard sprayer, an air-blast force is provided with a large rotatable fan blade 26 which is typically driven by a drive shaft (not shown) from a towing tractor, as understood by those of ordinary skill in the art. Through conventional air-jet manifolds well understood by those of ordinary skill in the art (also not specifically illustrated), forced air generated by rotation of fan blade 26 is output from a plurality of outwardly directed nozzles 28. Normally, such compressed air is continuously output from nozzles 28 during the entire time that fan blade 26 is rotated.

In accordance with this invention, a particular material application means or sprayer nozzle means is provided, wherein in the exemplary embodiment illustrated groupings of three adjacent nozzles are each collectively controlled as a group by respective actuation means, such as controllable solenoids 30, 32, and 34.

A holding means such as tank 36 is carried on mobile unit 10 and may contain 300 to 500 gallons of pre-mixed chemicals to be controllably passed to nozzles 28 through selective actuation of one of the above-mentioned solenoids. In this instance, "premixture" means that a concentrated active chemical ingredient is mixed in tank 36 with a relatively inactive carrier such as water. Optionally, it is possible to utilize the direct injection concepts mentioned in the above Background and Summary of the invention so that each application means activation provides dual control of separate containers for a carrier and a concentrated chemical active ingredient, respectively, to be fed to the respective nozzle or nozzles for mixing at that point and then air-blast sprayed with the force from rotating fan blade 26.

Although not illustrated in this instance, it is conventional that a pump, such as the model 6125 of Myers & Co. of Ashland, Ohio, may be carried on mobile unit 10 (such as underneath a hinged cover 38 thereof) for pumping liquid materials from holding tank 36 to hose means (not shown) which interconnect with the respective individual or grouped nozzles 28. In this instance, protected wiring 40 is used to control the solenoids via interconnections with various control means 41 which may also be protectively housed under hinged 38 for being moved together with mobile unit 10. Such control means are more particularly discussed with reference to FIG. 4 as well as other application figures.

Notwithstanding the optional sprayer control means features of exemplary methods and apparatus in accordance with the present invention, the broader aspects thereof directed to the present sensing features are also in part illustrated in connection with mobile unit 10 of present FIG. 1. As illustrated in FIGS. 1, 2A, and 2B, an exemplary vertical mast 42 is used together with two shorter vertical masts 44 and 46 for support of a plurality of ultrasonic transducer means at respective vertical heights. In this exemplary embodiment, three transducers 48, 50 and 52 are used to define a set of transducer distance determining means arranged horizontally and projecting outwardly from a given side of trailer 10 substantially perpendicular to the axis of the travel path of carriage 10 between the rows of trees 20 and 24. Obviously such set of ultrasonic detection means are involved with sensing target trees in only row 20 of such trees.

As generally known in the art, such ultrasonic distance detection means may be operated in a pulse/echo mode for sensing the distance between such detection means and the nearest foliage generally outward therefrom. As is known, an ultrasonic pulse measurement signal is emitted and slightly flares out as it is transmitted from the transducer. However, for the sake of simplicity in explaining the present sensing means, FIG. 2A represents such measurement pulses 54 as continuing primarily along their original axis of projection from their respective transducers. Likewise, reflected ultrasonic echoes 56 are illustrated with simplified substantially straight line characteristics for graphically representing the sensing mode of operation of such ultrasonic transducers.

As is known to those of ordinary skill in the art, a ranging circuit board (not illustrated) periodically transmits initial measurement pulses 54 as relatively short burst signals, and then "listens" for a return echo signal. In this instance, the echo is indicative of sensed target tree foliage nearest to the ultrasonic transducer outwardly therefrom. As discussed in greater detail hereinbelow, the speed of passage for such ultrasonic signals through the given medium (e.g. air) is known so that the timing relationship between the measurement initiation pulses and the corresponding reflected ultrasonic echoes may be processed to determine the distance between such respective ultrasonic distance determining means and the nearest target tree foliage outward therefrom.

As apparent from present FIG. 2A, foliage extension distances, i.e. the distance between the centerline of target tree 18 and the outward foliage thereof which interrupts and reflects measurement initiation pulses 54 in a given vertical band, may be identified and quantized as a foliar volume profile based on a vertical scan covering a plurality of respective heights. In one exemplary embodiment of this invention, the respective vertical positions of the bottom, middle, and top ultrasonic distance detection means are 115, 175, and 235 centimeters above ground level 58. It should be readily apparent to those of ordinary skill in the art that alternative elevations for, as well as configurations and numbers of, such ultrasonic distance detection means may be practiced in accordance with the present invention depending on given circumstances.

The right hand side of present FIG. 2A illustrates that an additional set of ultrasonic distance detection means 60, 62, and 64 may be provided on an opposite side of trailer 10 from the first set of ultrasonic distant detection means mentioned above. Such additional set permits simultaneous yet independent sensing in accordance with the present invention of target trees 22 in an opposing row of such trees 24 adjacent to row 20.

Similar to the first set of distance determining means, a measurement initiation pulse 54 is output therefrom at each respective height, and a return echo 56 is reflected from the initially contacted outward foliar extension of tree 22, where such foliage is present. As best illustrated with respect to ultrasonic transducer means 60, there is no reflected echo information where there is no foliage at the corresponding vertical height of transducer means 60 to reflect the measurement initiation pulse 54. In such manner, and further in view of the respective distance data signals determined at the respective vertical heights, distinguishable foliar volumes may be established for respective trees 18 and 22, as discussed in greater detail hereinbelow.

While FIG. 2A generally illustrates sensing operations of the present invention, present FIG. 2B illustrates an additional optional feature of this invention wherein the application of selected materials to sensed target trees is controlled based on such sensing. In particular, the configuration of actuated solenoids (which in turn each control a respected nozzle or a group of spray nozzles) is selected to obtain optimal application of the selected materials by spatially comparing the configuration spray pattern with the determined spatial characteristics of sensed target centroids to be sprayed.

In the present exemplary embodiment, and as discussed above with reference to FIG. 1, spray nozzles 28 are grouped in sets of three nozzles having a common manifold controlled by a single respective solenoid. Each such set of nozzles, such as the triple nozzle set 66 (illustrated as not actuated in present FIG. 2B) has its own respective material application spray pattern, which pattern differs from patterns of other grouped or individual spray nozzles. Such patterns also tend to spread as they emerge from the nozzles, i.e. vary in accordance with the distance outward from the respective spray nozzles.

In general, in accordance with the present invention, the spatial relationship between spatially characterized target load centroids and the either known or determined trajectory or spray patterns of the various spray nozzle means is considered so as to select a configuration of actuated spray nozzles (or single nozzle) which results in an optimal application of selected materials to the target load centroid (i.e. target trees). FIG. 2B represents the highly generalized case, wherein optional spray control is being subsequently activated based on earlier sensing information (such as from FIG. 2A) so as to actuate the bottom, middle, and top nozzle means on the left hand side of trailer 10 for optimally applying selected materials to larger tree 18, while only the middle and bottom spray nozzle means are activated on the right hand side of trailer 10 for optimally applying the selected materials to a relatively smaller target tree 22. In accordance with various aspects of the present invention, both the relative amount and vertical location of the load centroids presented by trees 18 and 22 in a given vertically-oriented sector thereof are determined and considered in comparison with the distance between such load centroids and the spray nozzle means, as well as in consideration of the trajectories or spray means application pattern, are used in making actuation configuration decisions.

The dotted lines illustrative of spray patterns as shown in FIG. 2B are not labeled so that the slightly spreading aspects of same may be easily visualized. It is in part because of such spreading patterns that the distance between the centerline of orchard sprayer 10 and the centerline of orchard trees 18 or 22 must be considered so that the proper configuration of spray nozzle means may be actuated by controlled operation of their respective solenoids or equivalent actuation means. For example, due to both the angle of trajectory and the spread of the spray patterns, there would be a decreasing tendency to utilize the top material application means (i.e. spray nozzle means) with increasing distances between such nozzles and the target trees because materials emanating therefrom would not properly strike the desired targets.

Referring once again to the overall structural layout of present FIG. 1, the various vertical masts 42, 44, and 46 thereof may if desired be mounted on a common harness member 68 which preferably straddles tank 36, and which may be slidably received in rail members 70 disposed on opposite sides of orchard sprayer 10 so that the position of the ultrasonic transducer means may be moved relative the axis of the orchard sprayer travel path and the location of the spray nozzle means (when present and used). While operational and control circuitry is generally discussed in greater detail below, one of ordinary skill in the art will appreciate that the ultrasonic transducer means housing units 72 may be advantageously outfitted with either one or two ultrasonic transducers depending on the vertical position thereof. Where opposing pairs of ultrasonic transducers are used within a single housing, such as in the upper and middle transducers of present FIG. 1, a total of four wires are used to interconnect such ultrasonic distance detection means with the remaining circuitry (two wires for each ultrasonic transducer as discussed in detail below) while only such two wires need be associated with the individual transducers outfitted in the lower vertical positions.

An example of a commercially available electronic ultrasonic transducer which may be used in accordance with the present invention is the Model 604142 ultrasonic transducer available from the Polaroid Corporation of Cambridge, Massachusetts. It has an approximate diameter of 4.3 centimeters and is designed for optimal operation of frequencies from about 45 to 65 kHz. The useful beam width angle of such transducer is approximately 23°, and it is adapted to function as both the transmitter and receiver.

Electronic circuitry used for integrally managing pulse/echo operation of such transducer is likewise commercially available circuitry, such as a single frequency ultrasonic ranging circuit board Model 607089, manufactured also by the Polaroid Corporation of Cambridge, Mass. The details of such ranging board form no essential part of the present invention, and hence need not be described further herein (reference to commercial materials being adequate for those of ordinary skill in the art). The board contains the necessary circuit components to actually generate the transducer measurement initiation signal, i.e. the transmitted signal, and receive the return echo signal.

Housing members 72, being adapted for supporting ultrasonic transducers and their respective commercial ranging boards, may also house a digital interface circuit discussed more particularly hereinbelow with reference to present FIG. 6, as well as a power transmission circuit discussed in greater detail hereinbelow with reference to present FIG. 7. Also, various flow rate measuring devices 74 may be used in connection with various embodiments of the present invention concerning material application control, for purposes of more particular quantizing various application characteristics.

While present FIGS. 1, 2A, and 2B illustrate a symmetrical approach to nozzle configuration, with three manifolds each consisting of two identical sets of grouped nozzles positioned respectively at the top, middle, and bottom of the sprayer outlet on each side thereof, it is within the spirit and scope of the present invention to practice alternatives, such as an asymmetrical nozzle arrangement. With any such alternative nozzle arrangements, it would be possible to conduct material deposition studies in accordance with this invention for a number of different nozzle configurations and develop therefrom control methods to match optimal application configurations to any particular sensed target crop characteristics. Additionally, the number of nozzle manifolds could be expanded beyond three to allow greater resolution in sprayer output levels. Methodology in accordance with the present invention, discussed in greater detail hereinbelow, could be readily applied to alternative manifold arrangements in accordance with the general concepts herewith.

Figure 3:
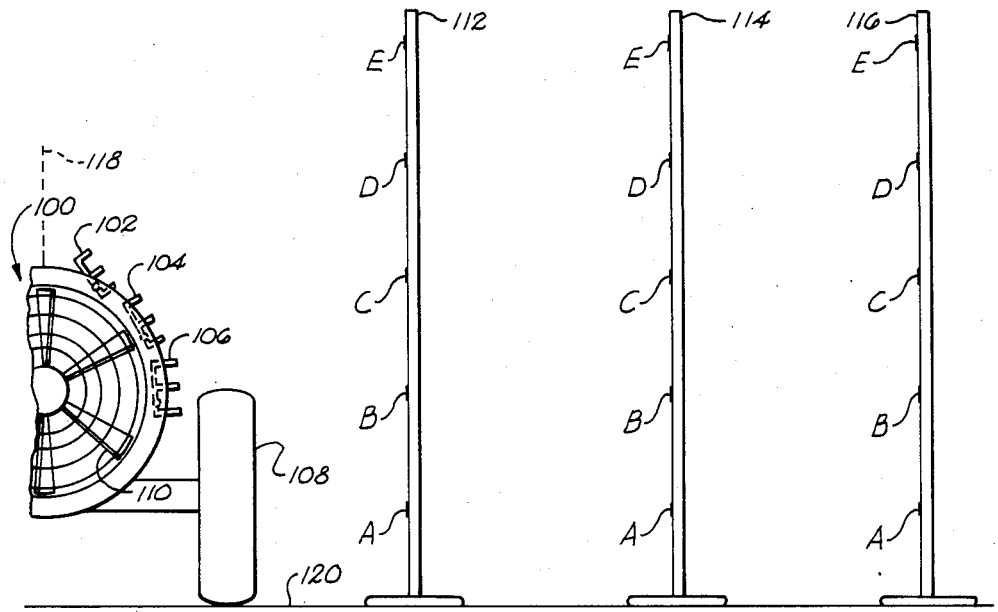
FIG. 3 illustrates a partial end view of the exemplary orchard sprayer of present FIG. 1, together with an artificial target configuration which may be used in accordance with the present invention for spray deposition empirical testing to produce a control algorithm concerning certain aspects of various methods in accordance with this invention.

Referring to present FIG. 3, one exemplary arrangement is illustrated for empirical testing of spray deposition patterns to permit development of a control algorithm in accordance with the present invention. Such testing results in characterization of the various spray patterns for each of the nozzle means. As described in the Background of the present invention, theoretical information in the area of air-blast sprayer control is generally insufficient to permit design of a system meeting specific criteria. In this instance, one general task of the control algorithm disclosed herein is to read data from a target tree, i.e., foliage, sensing system, determine the optimal nozzle manifold configuration based thereon, and automatically output corresponding manifold control signals. A total orchard sprayer control system requires integration of a foliage sensing system, a sprayer manifold control system, and an onboard control means, e.g. a computer, serving as the physical link between the systems. The empirical deposition studies conducted with the experimental arrangement of present FIG. 3 leads to a control algorithm enabling an onboard computer system to become such physical link.

FIG. 3 illustrates a partial view of a rear end perspective of an air-blast type orchard sprayer 100 (generally operative as described above with reference to the sprayer of present FIG. 1). Sprayer 100 has top, middle, and bottom nozzle means 102, 104, and 106, respectively. Each such nozzle means includes a bank of three separate but similar nozzles commonly associated with a manifold controlled by a respective actuation means such as a solenoid (not illustrated in this Figure). As understood from the perspective view of present FIG. 1, the nozzle means are longitudinally displaced from the sprayer wheels, and therefore nozzle means 106 is not obstructed by wheel 108 as tends to appear from the rear elevational view of present FIG. 3.

As understood by those familiar with air-blast sprayers, rotation of fan blade 110 in cooperation with associated air channels causes continuous air-blast from nozzles 102 through 106. Further, controlled introduction of spray materials into such air-blast causes the respective nozzle means to spray the materials outward in a generally repeatable and determinable spray pattern. Methods of determining spray deposition patterns were devised. For determining non-foliage spray deposition test results, three poles 112, 114, and 116 were erected at respective distances of 1.5 meters, 2.5 meters, and 3.5 meters from the right side of the sprayer outlet as measured perpendicularly from the axis of sprayer travel, illustrated by dotted line 118. It should be noted that present FIG. 3 is intended for schematic purposes only, and is not intended to be interpreted as drawn to any particular scale. Target areas A–E are situated on each of the target poles. Only one of the poles was present for each respective pass of orchard sprayer 100. Multiple spray passes were made for each target pole, actuating only one of the three nozzle manifolds at a given time. The resultant chemical deposition onto the target areas or cards was then analyzed in each instance to determine a microliter per square centimeter deposition rate. The height of target areas A–E above ground level 120 was 1.0 meter, 1.5 meters, 2 meters, 2.5 meters, and 3 meters, respectively. While various analysis techniques may be practiced, in general the target areas may comprise cards of predetermined area which were susceptible to having the spray deposition thereon measured with a relatively high degree of accuracy.

The results of empirical testing with the experimental configuration of present FIG. 3 are set forth in Table A which shows the spray deposition from the respective top, middle, and bottom manifolds in microliters per square centimeter at the various combinations of distances and heights possible with each target area of the respective target poles.

TABLE A

Ideal spray deposition test results.

| Distance (m) | Height (m) | Spray Deposition from Manifold ($\mu$L/cm$^2$) Top | Middle | Bottom |
|---|---|---|---|---|
| 1.5 | 1.0 | 1.3 | 2.9 | 4.1 |
| | 1.5 | 2.0 | 4.1 | 4.1 |
| | 2.0 | 2.6 | 3.7 | 2.7 |
| | 2.5 | 3.3 | 3.2 | 1.1 |
| | 3.0 | 3.5 | 3.0 | 0.9 |
| 2.5 | 1.0 | 1.0 | 2.7 | 4.1 |
| | 1.5 | 2.2 | 3.9 | 4.1 |
| | 2.0 | 2.5 | 3.9 | 3.9 |
| | 2.5 | 2.4 | 3.2 | 2.7 |
| | 3.0 | 2.7 | 2.7 | 1.5 |
| 3.5 | 1.0 | 0.9 | 2.5 | 3.2 |
| | 1.5 | 2.0 | 3.3 | 3.7 |
| | 2.0 | 1.9 | 3.0 | 3.5 |
| | 2.5 | 1.7 | 2.6 | 2.1 |
| | 3.0 | 1.0 | 1.2 | 1.0 |

To obtain the best possible results for the basis of creating a control algorithm for orchard sprayer control, an empirical deposition study similar to the ideal test configuration of present FIG. 3 was conducted for in-foliage conditions. Eight target poles were placed in various locations in and about mature peach trees to compare what effects the presence of foliage would have on deposition in the target areas. Table B sets forth the empirical results of the in-foliage spray deposition tests. The positions of the various eight poles were as follows: poles 1, 4, and 7 were positioned 1.5 meters from the right side of the sprayer outlet and were within the tree foliage; poles 2, 5, and 8 were placed 2.5 meters from the sprayer outlet and as near as possible to the tree trunk; poles 3 and 6 were positioned 2.5 meters from the sprayer outlet and directly between two adjacent trees. The row-to-row spacing between the trees was 6 meters while the sprayer centerline to the outlet dimension was 0.5 meters. Thus, the poles positioned 2.5 meters from the outlet were coincident with the tree row centerline.

TABLE B

In-foliage spray deposition test results.

| Pole (#) | Height (m) | Spray Deposition from Manifold ($\mu$L/cm$^2$) Top | Middle | Bottom |
|---|---|---|---|---|
| 1 | 1.0 | 1.3 | 2.4 | 4.1 |
| | 1.5 | 2.8 | 4.1 | 4.1 |
| | 2.0 | 2.5 | 3.8 | 3.0 |
| | 2.5 | 2.5 | 2.8 | 0.9 |
| | 3.0 | 2.1 | 2.0 | 0.3 |
| 2 | 1.0 | 0.6 | 1.5 | 4.0 |
| | 1.5 | 0.8 | 1.7 | 2.2 |
| | 2.0 | 1.1 | 2.3 | 2.2 |
| | 2.5 | 0.4 | 1.1 | 0.6 |
| | 3.0 | 0.3 | 0.7 | 0.2 |
| 3 | 1.0 | 0.9 | 2.1 | 4.1 |
| | 1.5 | 1.2 | 3.5 | 4.1 |
| | 2.0 | 2.2 | 3.2 | 2.6 |
| | 2.5 | 1.2 | 2.4 | 1.9 |
| | 3.0 | 0.9 | 1.2 | 0.7 |
| 4 | 1.0 | 0.9 | 2.7 | 4.1 |
| | 1.5 | 1.4 | 4.1 | 4.1 |
| | 2.0 | 1.1 | 1.5 | 1.8 |
| | 2.5 | 0.2 | 0.2 | 0.2 |
| | 3.0 | 0.3 | 0.3 | 0.2 |
| 5 | 1.0 | 0.2 | 0.8 | 2.2 |
| | 1.5 | 0.4 | 2.1 | 3.4 |
| | 2.0 | 0.4 | 1.6 | 2.2 |
| | 2.5 | 0.2 | 0.3 | 0.2 |
| | 3.0 | 0.1 | 0.2 | 0.1 |
| 6 | 1.0 | 0.8 | 3.0 | 3.8 |
| | 1.5 | 0.5 | 2.3 | 3.3 |

TABLE B-continued

In-foliage spray deposition test results.

| Pole (#) | Height (m) | Spray Deposition from Manifold (μL/cm²) | | |
|---|---|---|---|---|
| | | Top | Middle | Bottom |
| | 2.0 | 0.4 | 1.2 | 1.9 |
| | 2.5 | 0.8 | 1.3 | 1.6 |
| | 3.0 | 0.8 | 0.7 | 0.5 |
| 7 | 1.0 | 1.3 | 3.1 | 4.1 |
| | 1.5 | 2.0 | 4.1 | 4.1 |
| | 2.0 | 1.9 | 3.7 | 3.0 |
| | 2.5 | 0.5 | 0.6 | 0.2 |
| | 3.0 | 0.8 | 0.8 | 0.2 |
| 8 | 1.0 | 0.3 | 0.6 | 1.8 |
| | 1.5 | 0.2 | 0.6 | 0.7 |
| | 2.0 | 0.6 | 2.1 | 1.7 |
| | 2.5 | 0.2 | 0.4 | 0.2 |
| | 3.0 | 0.2 | 0.2 | 0.1 |

In general, the following empirical test conclusions may be stated. The bottom nozzle manifold was found to achieve superior overall spray deposition, with the bottom manifold deposition being greatest at the 1.0 and 1.5 meter elevations on all poles. However, the bottom manifold deposition was reduced at both the 2.5 meter and 3.0 meter elevations. Middle manifold deposition was superior at middle elevations near the sprayer outlet, but such superiority was greatly decreased at pole locations more remote from the sprayer outlet. Except at higher elevations which were near the sprayer outlet, overall deposition from the top manifold was considered relatively poor.

Based on this methodology of determining respective spray patterns for different nozzle configurations, the spatial characteristics of such spray patterns may be related to sensed spatial characteristics of target trees for actuating selected configurations of spray nozzles for optimal material application to such target trees. Specifics of control means in accordance with this invention for accomplishing such function is set forth more particularly below with reference to the remaining figures.

Figure 4:
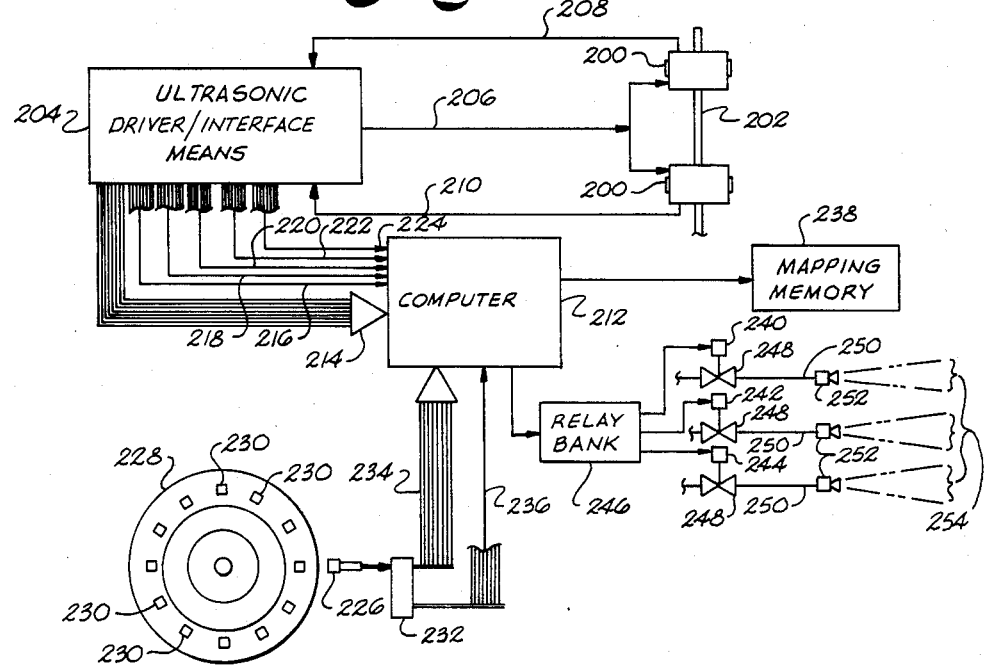
FIG. 4 illustrates a schematic representation of one exemplary control system provided in accordance with the present invention.

While various systems may be provided for practicing the present sensing features, or the optional sprayer control features of the present invention, FIG. 4 illustrates one exemplary embodiment of a construction capable of performing both such functions. FIG. 4 essentially comprises a schematic representation of a block diagram for an exemplary system, the details of which are discussed with reference to later figures of this application.

Distance determining means are provided by a plurality of ultrasonic transducers 200 positioned at various vertical heights (such as on a upright mast 202) and electronically associated with ultrasonic driver/interface means 204, for providing respective distance data outputs corresponding with each of the different vertical heights. Each data output corresponds to respectively sensed distances between the different vertical locations on mast 202 and the nearest tree foliage outward therefrom of a target tree situated in a row of such trees along which the apparatus is transported. The ultrasonic transducer and its associated ranging circuit board may comprise readily available commercial components, such as the Polaroid Corporation components noted above. The ultrasonic driver/interface means 204 further preferably includes a digital interface circuit (discussed in greater detail below with reference to present FIG. 6), and a power transmission circuit (discussed below with reference to present FIG. 7).

As schematically represented in present FIG. 2A, the ultrasonic transducers are operated in a pulse/echo mode of operation. In other words, a triggering or measurement initiation signal may be represented as output to the transducers on line 206, while respective reflected or echo signals are representatively returned to such driver/interface means on lines 208 and 210, respectively associated with one each of the ultrasonic transducers. All of the transducers on a given side of mast 202 constitute a set of transducers independently operated in a common measurement cycle of distance determining means operation. The timing of such cycle of operation is discussed in greater detail below with reference to other figures.

Ultrasonic driver/interface means 204 operates completely independently of any control or timing signals from computer means 212, which may comprise any of a variety o self-contained, transportable computers such as the "Portable Personal Computer" by the IBM Corporation. For each cycle of operation of the distance determining means, the interface means outputs updated distance data outputs on parallel 8-bit lines 214, 216, 218, 220, 222, and 224. Such six parallel lines and the data outputs they carry correspond respectively with the six mast-mounted ultrasonic transducers and their respective vertical positions shown in present FIGS. 1, 2A, and 2B. Thus, in the presently preferred exemplary embodiment, there are two sets of distance data outputs, each respectively including outputs corresponding with relative top, middle, and bottom vertical height positions. Generation of distance data outputs 214–224 is explained below with reference to present FIGS. 5 and 6.

Because a given cycle of operation of the distance determining means of present FIG. 4 is relatively short, preferably about 200 milliseconds, the most current operation cycle set of distance data outputs are being relatively rapidly updated at the inputs to computer means 212. However, computer means 212 does not process each set of distance data outputs. Instead, processing or storage functions of computer 212 operate independently of the distance determining means operational cycle. In fact, practice of the present invention makes possible use of the most recent measurement cycle distance data outputs as input available at all times to computer means 212, while eliminating the need for critical timing or hand-shaking between the distance determining means and the computer.

Computer 212 decides when to obtain the most current measurement cycle of distance data outputs by monitoring an input thereto from a transport displacement sensing means. For example, a proximity sensor 226 (represented by element 76 in present FIG. 1) may be mounted adjacent a rotatable wheel 228 of a mobile unit carrying the FIG. 4 apparatus. With proximity sensor actuators 230 positioned equidistantly about such wheel 228 (not illustrated in FIG. 1), an incremental distance signal may be obtained each time a sensor actuator passes relatively close to proximity switch 226. Such occurrence is indicative of the apparatus being transported a predetermined incremental distance relative a row of target trees (since wheel 228 is assumed to be in non-slipping contact with the ground). A displacement/speed counter means 232 (discussed in detail below with reference to present FIG. 10) may be provided for receiving and processing the signal from proximity sensor 226 so that computer 212 receives in parallel 8-bit data 234 corresponding with displacement information and 8-bit data information 236 corresponding with calculated speed information.

As discussed further hereinbelow, the incremental distance information obtained via input 234 may be used as a command to the computer to accept and/or process the current distance data outputs on lines 214-224. Also, information on both lines 234 and 236 may be respectively stored in an orderly array in a mapping memory 238 under control of computer 212, together with the corresponding distance data output information. Such stored information may be later processed for determining both the relative amount or size of a target load centroid, as well as the vertical distribution of such centroid, all of which information may be processed together with the incremental distance information for determining foliar volumes for sensed target trees.

As a further alternative feature which may be practiced in accordance with a given embodiment of the present invention, computer 212 may in relative real-time process the respective distance data outputs on lines 214-224, and subsequently control actuation means 240, 242, and 244 through a logic device such as relay bank 246. Such actuation means may comprise electronically-switchable solenoids which in turn control flow valves 248 which controllably interrupt respective flow lines 250 (i.e. hose means) which interconnect a chemical holding tank (such as tank 36 of FIG. 1) with nozzle means 252. Nozzle means 252 may comprise an individual nozzle or a grouped array of multiple nozzles under the common control of a single solenoid, as well illustrated in present FIGS. 1 and 3. The spray patterns 254 of such nozzle means 252 may be determined, and the spatial characteristics thereof considered in connection with the sensed spatial characteristics of target load centroids for selecting the particular actuation of solenoids 240, 242, and 244 needed to obtain the optimal configuration of activated nozzle means resulting in optimal application of materials to the sensed target centroids. One exemplary control algorithm for achieving such control features is discussed in greater detail below with reference to present FIGS. 12 and 13.

It should be understood that while present FIG. 4 illustrates a relay bank and associated control mechanisms with computer means 212, a given construction of the present invention is not restricted to inclusion of such features, and instead may include only a mapping means 238 for storing target crop profiles in electronic data files, which information may be subsequently used in a variety of manners. Likewise, methods and algorithms stated herein are not limited to inclusion of the optional control features included with the illustration and related discussion of present FIG. 4.

Figure 5:
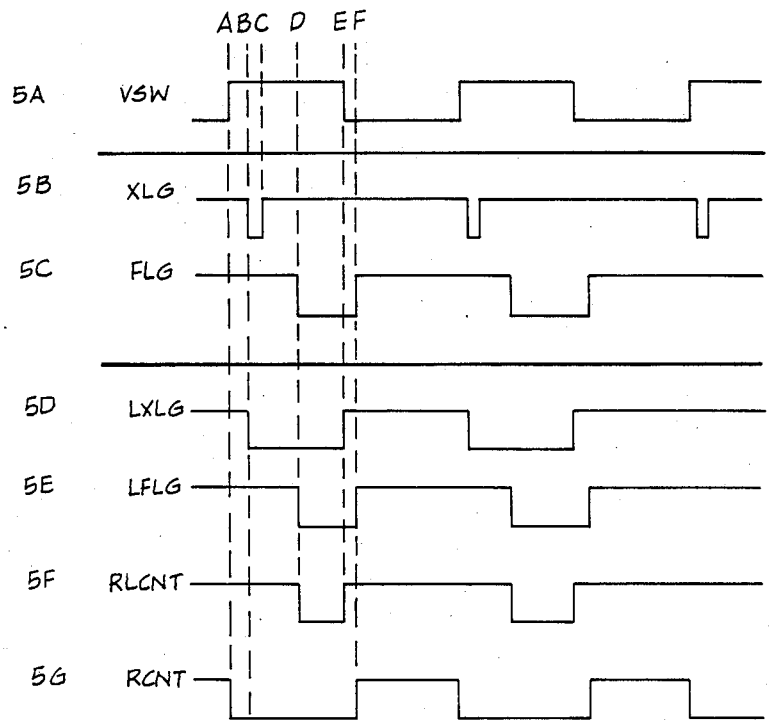
Figure 6:
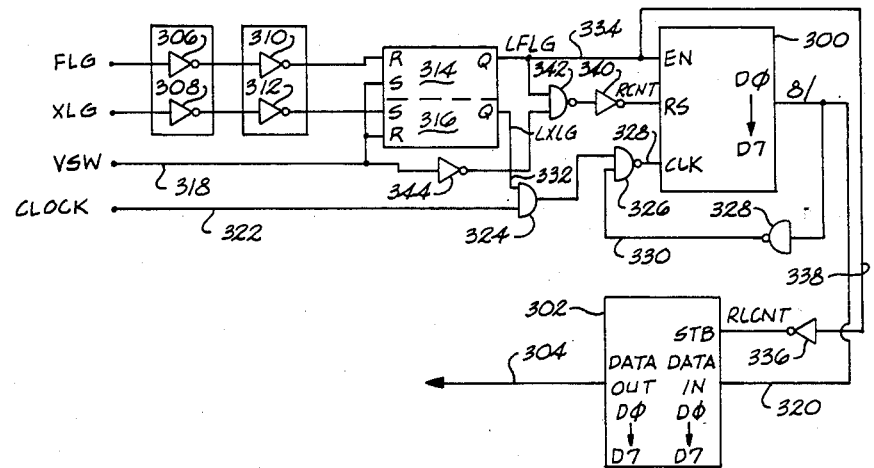
FIG. 6 illustrates an exemplary digital interface circuit in accordance with one embodiment of this invention, incorporating use of various of the timing signals represented in FIGS. 5A–5G.

Turning now to FIGS. 5 and 6, details of an exemplary digital interface circuit in accordance with the present invention are discussed. In particular, the nomenclature for the timing diagrams of FIGS. 5A-5C is derived from conventions established by the Polaroid Corporation with respect to their above-mentioned ultrasonic transducer and ranging circuit board therefor. In particular, VSW constitutes a transmission initiation signal, generation of which is discussed in greater detail with reference to FIG. 7 below. Signal XLG comprises the actual transmission of an ultrasonic pulse signal in connection with operation of a ranging circuit board, with FLG comprising the reflected echo signal. Since a ranging board such as the Polaroid Model 607089 is commercially available and may be used with the present invention without modification, details of such conventional ranging board and its respective ultrasonic transducers do not form essential parts of the present invention. Accordingly, reference may be made by those of ordinary skill in the art to readily available commercial materials for detailed circuitry thereof.

The remaining timing diagrams, FIGS. 5D-5G, more particularly relate to signals developed in the logic circuits of the present FIG. 6 digital interface circuit, discussed in greater detail below. FIG. 6 generally concerns a functional diagram of a digital interface circuit in accordance with the present invention used to convert the time delay between XLG and a reflected FLG echo signal to an 8-bit distance data output. VSW is an external control signal to which the Polaroid Corporation ranging board responds to initiate a measurement cycle for an individual transducer. The transmission signal XLG and the detected echo signal FLG are generated by such ranging board.

Referring now to events A-F of FIG. 5, the transmission initiation signal VSW fed to a transducer means ranging board (not shown) is driven from low to high at event A. Approximately 7 milliseconds later, at event B, the ultrasonic transducer under control of its respective ranging board emits a 1 millisecond burst of 49 kHz ultrasound (which burst concludes at event C). The initiation of such transmission is observed as a high to low transition of the XLG signal. The ranging board then automatically detects a return echo, such as at event D, and signifies same by the high to low transition of the FLG signal. Therefore, the actual time delay between events B and D represents the variable time between ultrasonic transmission and echo return. The length of such time delay is directly related to the distance between the transducer and the object causing reflection of the XLG pulse, which in the presently preferred embodiment comprises the foliage of a target tree nearest the emitting transducer. VSW is kept high throughout such measurement, but is driven low at event E to reset the system for the next measurement. At event F, approximately 100 microseconds later, the ranging board responds to the event E reset of VSW to return FLG high in further preparation for the next individual transducer measurement cycle. The collective measurement cycles of a commonly operated set of transducers comprises an operation cycle of the distance determining means.

Various digital interface boards have been disclosed in prior art for connecting transducers and their associated ranging boards with a micro-computer. For example, Ciarcia (1980 and 1984); McMahon et al. (1982); and McConnell et al. (1983) all disclose systems wherein a transducer distance detection means is operated under the direct control of a computer, thereby requiring the use of critical timing or handshaking signals between the computer and the distance detection means.

Present FIG. 6 is an exemplary construction of a digital interface circuit in accordance with the present invention which instead permits independent operation of the ultrasonic distance detection means relative a computer. Since the distance measurement system and the computer function independently of one another, virtually any computer or processor with a digital input capability may be used in connection with the sensing system disclosed in accordance with the present invention. Additionally, the most recent measurement cycle of the sensing system is always available for input, thereby further eliminating the need for critical timing or hand-shaking between such sensing system and the computer.

FIG. 6 utilizes an electronic timing concept to convert the XLG-to-FLG time delay to an 8-bit distance data output. A counting clock signal of known frequency is generated (as discussed in greater detail with reference to present FIG. 9, below) and used to drive a counter 300, such as a 4520 counter having enable, reset, and clock inputs, and an 8-bit output. Essentially, the counter counts the time between two events, FLG and XLG (events B and D of FIGS. 5B and 5C, respectively).

So as to at all times maintain the most recent count available for input to a digital micro-computer, the previous count is maintained while the counter is prepared for a new measurement and while the actual counting takes place. A data latch means 302 is used between the counter and the data output 304 in order to accomplish such function. Data latch means 302 may comprise for example a 4508 data latch, having 8-bit data in and data out lines, and a strobe input for effecting the latch operation thereof, as is understood by those of ordinary skill in the art. Likewise, operation of counter 300 is similarly well understood by those of ordinary skill in the art.

Since signals FLG and XLG are generated under control of the Polaroid Corporation ranging board, conditioning thereof is desireable for use with the digital interface circuit of present FIG. 6. Accordingly, a pair of high impedance drivers 306 and 308, such as Darlington drivers 2003A, may be used respectively in line with such signals, and a respective pair of CMOS 4049 inverters, 310 and 312, may be used to input the FLG and XLG signals to the R and S inputs respectively of a pair of S-R latches 314 and 316. Such latches may comprise well known 4044 S-R latches, operation of which are understood by those of ordinary skill in the art.

The Q output of latch 314 defines a latched XLG signal (LXLG) while the Q output of the other latch 316 comprises a latched FLG output (LFLG). Measurement initiation signal VSW is input via line 318 to the respective S and R inputs of latches 314 and 316 to indicate to the circuitry of FIG. 6 the commencement of a measurement cycle. Inclusion of latches 314 and 316 is generally desired since signals XLG and FLG transmit information through their state transitions, rather than the states themselves. The respective latch signals are used to control operation of counter 300 and latch means 302. While the counter is being reset or while actual counting being done, latch means 302 holds the previous count input thereto via 8-bit lines 320. When counter means 300 finishes a current count (i.e. a current measurement cycle for an individual transducer), the actual count is transferred to the data latch means 302 on such lines 320. In such fashion, the most recent distance data output for the current measurement cycle is always available as the latch output 304 to be fed to computer 212 of FIG. 4 whenever a strobing signal is input to latch means 302.

The digital interface circuit of present FIG. 6 is designed so that in the event no echo is detected by the transducer within a given cycle of operation, the FLG signal would remain high (i.e. not be driven low) throughout such measurement cycle and the counter 300 would never be stopped. In such event, a maximum distance output is generated, which depends on the actual clocking frequency input on line 322 through an AND gate 324 and NAND gate 326 to the clocking input 328 of counter means 300. Also, if the time delay between signals FLG and XLG exceeds the maximum count value, the counter resets to zero when the maximum is exceeded (by virtue of the feedback through the NANDed inputs to NAND gate 328 and feedback line 330, also serving as an input to NAND gate 326. In either case, an erroneous distance count is read, and the interface circuit of FIG. 6 locks the counter at its full count anytime the full count is reached.

Latched XLG signal LXLG is set by the negative edge of XLG (actual transmission of an ultrasonic pulse signal), and reset by the negative edge of VSW at event E of FIG. 5A (i.e. whenever VSW is driven low to reset the entire system for a new measurement cycle of operation). In turn, LXLG is used as an input on line 332 to AND gate 324 for commencing counting with counter 300 at event B (keeping in mind that the time delay between events B and D of FIGS. 5B and 5C, respectively, is the time of interest which is to be counted by counter means 300).

LFLG comprises a latched FLG signal which is set low through latch 314 by the negative edge of FLG (VSW being held high throughout) and reset high by the positive edge of signal FLG. Such reset occurs after VSW has returned to its low state so that a measurement cycle is completed. Since signal LFLG is fed to the enable input of counter means 300 on line 334, counter means 300 is disabled or stopped at event D of FIG. 5C. Accordingly, events B and D of FIGS. 5B and 5C respectively are used to start and stop counter means 300 so that the 8-bit output on line 320 is indicative of the time delay of interest, as noted above.

Interaction between latches 314, 316, counter means 300, and latch means 302 is controlled by several additionally created signals. A read and latch count signal RLCNT (FIG. 5F) is created by using an invertor 336 to invert the LFLG signal input thereto on line 338. Signal RLCNT thus comprises a strobe signal for latch means 302, so as to open the latch and read the counter data on parallel 8-bit lines 320 at event D, i.e. the receipt of the reflected echo, while closing the latch at event F (the end of the measurement cycle). Signal RCNT is created as a reset count signal, and is generated by taking the inverse (with invertor 340) of the NAND gate 342 output of the NANDing of LFLG and the inverse (with invertor 344) of VSW. Signal RCNT is used to reset the reset input of counter 300 at event F (the end of a measurement cycle). Additional description of the operation of the individual digital circuit components of present FIG. 6 is not necessary since such elements are well known to those of ordinary skill in the art.

Referring now to some of the central support circuitry for an exemplary embodiment in accordance with the present invention, it is well understood by those of ordinary skill in the art that various power and ground signals are required throughout the present circuits, but may be provided as needed by same without specific illustration herewith.

Figure 7:
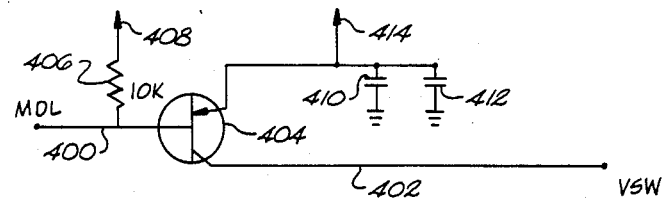
FIG. 7 illustrates a power transmission circuit for use with ultrasonic transducers in accordance with the present invention for outputting ultrasonic sensing pulses therefrom.

FIG. 7 illustrates a power transmission circuit, responsive to a low power logic signal MDL on input line 400 thereof to output a 1 millisecond pulse VSW of approximately 2.5 amps on line 402, which is the same VSW signal mentioned above as separately routed to each of the ultrasonic transducer means. Thus, VSW initiates the measurement sequence in accordance with the timing diagram of present FIG. 5A, and also supplies the high power necessary for such ultrasonic transmission. A power transistor 404 (such as an MPS U95) may be used with a biasing resistor 406 (connected to a five volt power supply through terminal 408 thereof) and storage capacitors 410 and 412 (likewise connected to a five volt power supply, not shown, through terminal 414) to generate the VSW signal. Additional particulars of the FIG. 7 power transmission circuit (which follows a design thereof generally suggested by Polaroid Corporation materials concerning their respective ranging board) need not be discussed for an understanding of same by those of ordinary skill in the art.

As discussed above with reference to present FIG. 1, each ultrasonic transducer means in housing 72 is interconnected to various central support circuitry through two respective connectors. For example, the power supply and initiation signal VSW discussed above may be routed to the respective ultrasonic transducer means through one of such connections. Preferably, to allow maximum system configuration flexibility, the data and the support signals are routed through respectively different connectors. In other words, the 8-bit output data lines (such as line 304 of present FIG. 6) are carried through one connector in its respective line, while the other connector and its respective line carries the power, ground, counting clock, and cycle initiation signals.

As discussed above, the counting clock signal 322 of present FIG. 6 is used to determine the amount of time delay occurring between a given pair of ultrasonic transmission and reflected echo signals. Thus, such clock signal is fairly critical to the overall system accuracy and performance. Instead of generating a clock signal within each ranging unit (whenever a plurality of ranging units are used in accordance with various embodiments of the present invention), a common signal is preferably generated within the central support circuitry and routed to each such unit. Therefore, variability between the units is reduced and the overall system simplified.

Likewise, the low power logic transmission initiation drive signal (MDL) used to begin each measurement cycle for respective ranging units is also preferably centrally produced. Such MDL signals not only control the time at which the individual measurement cycles begin, but also the frequency at which the measurements are taken by each unit. The ranging board manufacturer recommends a measurement cycle frequency of five Hz, which frequency is preferably used in accordance with the present invention. Of course, various alternative frequencies may be practiced.

Figure 8:
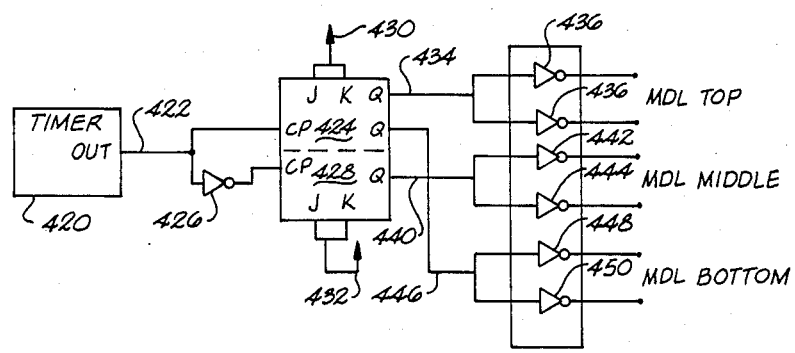
FIG. 8 illustrates an exemplary drive sequencing circuit for driving a plurality of ultrasonic transducers, in accordance with the present invention.

Present FIG. 8 illustrates one embodiment of a drive sequencing means generating a plurality of staggered MDL signals for use in connection with a construction of the present invention having two opposing sets of three ultrasonic detection means each (top, middle, and bottom; as in the exemplary embodiment of present FIG. 1). To generate the desired 5 Hz drive signal for each respective ultrasonic transducer means, a 10 Hz 50% duty cycle square wave is preferably produced with a timer means 420 (such as an ICM 7555 timer circuit operated in astable operation). Output 422 of such timer means is both fed directly to a clock pulse input of a J/K flip flop 424, and is inverted through an invertor 426 and fed to the clock pulse input of a complementary J/K flip flop 428. The J and K inputs of both such flip flops (which may comprise a conventional 74C107 device) are connected with a five volt power supply through respective connectors 430 and 432 thereof.

The signal offset introduced with the invertor 426 and the selected use of the Q and $\bar{Q}$ outputs of the flip flops enables creation of three separate 5 Hz signals, each out of phase with the other by 50 milliseconds. Such three signals are used to sequentially trigger the top, middle, and bottom ranging units of the two respective sets of such ranging units. Such arrangement prevents interference from one unit to another during a collective measurement cycle of distance determining means operation.

As illustrated in present FIG. 8, the Q output 434 of flip flop 424 may be split between Darlington drivers 436 and 438 (such as drivers 2003 A) for providing MDL signals for each of the respective top position ultrasonic distance detection means. Similarly, the Q output 440 of flip flop 428 may be fed through drivers 442 and 444 to selectively initiate a measurement operation in the respective middle position distance detection means of the two sets of such means. The $\bar{Q}$ output 446 of the first flip flop 424 is preferably used to initiate measurement with the bottom position distance detection means of the respective sets thereof, through drivers 448 and 450.

It is understood by those of ordinary skill in the art that the power transmission circuit of present FIG. 7 is preferably uniquely repeated for each of the six respective MDL outputs of present FIG. 8 so that each such output may in turn (as sequenced by the circuitry of FIG. 8) trigger a pulse/echo mode of operation for its respective ultrasonic transducer means. Of course, equivalent MDL-type sequenced signals may be used to trigger other equivalent distance detection means in accordance with the present invention.

Figure 9:
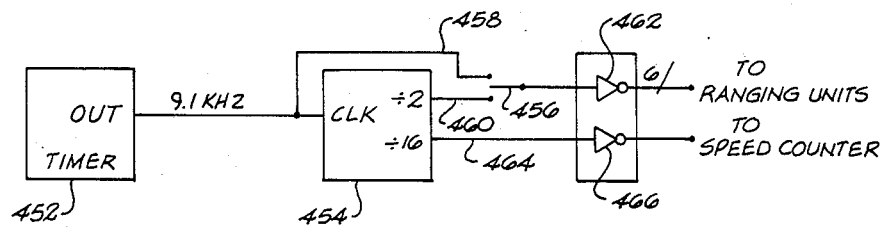
FIG. 9 illustrates an exemplary clock circuit provided in accordance with features of this invention for providing clock signals as discussed herein, particularly with respect to present FIGS. 6 and 10.

FIG. 9 illustrates an exemplary centralized clocking circuit for use in accordance with the present invention, wherein a timer means 452 similar to timer 420 of present FIG. 8 is operated in astable operation to produce a 9.1 kHz square wave with a 50% duty cycle. Such signal frequency corresponds to a signal period of 110 microseconds. With a maximum 8-bit count of 255, the maximum time delay which could be measured by circuitry such as in FIG. 6 is 28 milliseconds with a resolution of 110 microseconds. With a nominal velocity of sound in air of 343 meters per second, the maximum measurement range is 4.8 meters with a resolution of 1.9 centimeters.

However, as illustrated in present FIG. 9, a 4040 counter circuit 454 may be configured as a divider so that a manually operable switch 456 may be used to select a lead line 458 to obtain such 9.1 kHz signal, or to select a lead line 460, which has a frequency which is one-half that of the 9.1 kHz signal, i.e. 4.55 kHz. By selectively routing such 4.55 kHz signal to the ranging units through Darlington driver 462, the maximum range can be extended to 9.6 meters with a decreased resolution of 3.8 centimeters. If desired, a plurality of switches may be installed to facilitate various frequency selections. Since a typical orchard tree row-to-row spacing is 3.05 meters, the 9.1 kilohertz frequency is generally preferred for use with the respective ranging units as clock inputs 322 of present FIG. 6.

Figure 10:
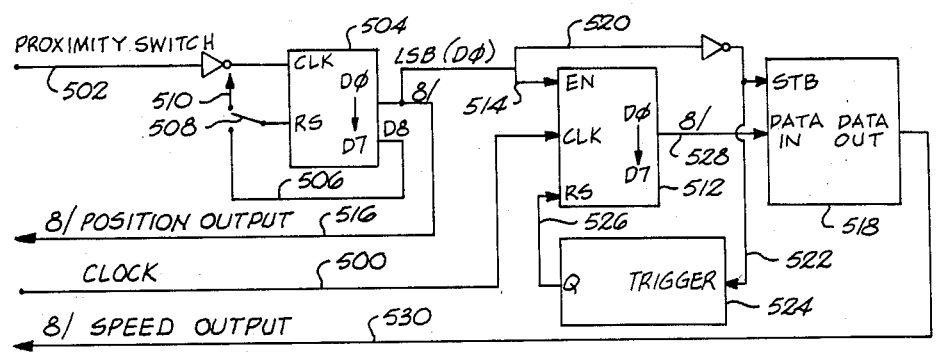
FIG. 10 illustrates a displacement/speed counter circuit for providing displacement and speed signals in accordance with this invention for alternative use therewith as discussed hereinbelow.

A divide-by-16 output 464 is also available from divider 454 so that a 569 Hz signal may be created for use with a sprayer displacement/speed monitor circuit, described below with reference to FIG. 10. A Darlington driver device 466 is preferably used to route the 569 Hz signal to a clock input 500 of present FIG. 10.

To further make possible the independent operation of a distance detection system and a computer means, as generally discussed above, sampling times for the computer (i.e. acceptance of data from the distance detection means) are preferably established by determining the relative location of the apparatus along the row of trees while the range data is read. A particular set of distance measurements from a corresponding set of the ranging units, such as all those on one side of the mobile unit, represents a segmented vertical scan of tree foliage at such sampling point. To time input of particular sampling points to the computer, and in order that the range data may be used to construct a profile of tree foliar volumes along a section of the row, a displacement circuit such as in present FIG. 10 may be used. Also, where material application control is optionally practiced, it is desirable to take range readings before the sprayer outlet reaches the point where the measurements were taken. A circuit as in present FIG. 10 also conveniently permits ground speed measurements to be readily monitored.

While numerous alternatives displacement sensing means may be used, one preferred embodiment counts the revolutions of one of the sprayer ground wheels, as mentioned in reference with wheel 12 and proximity sensor switch 76 of present FIG. 1, and wheel 228 and proximity sensor switch 226 of present FIG. 4. Essentially, the displacement/speed counter circuit 232 of present FIG. 4 is illustrated in detail in present FIG. 10.

Figure 11:
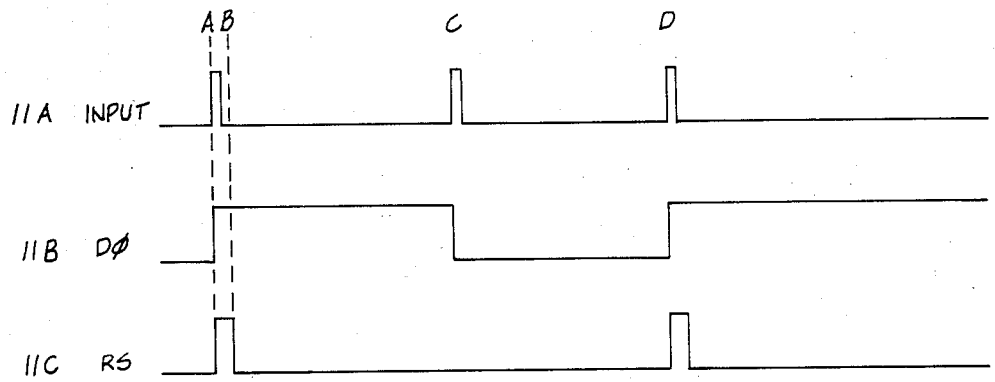

Since an orchard sprayer is normally towed between tree rows on firm, grassy ground, wheel slip is assumed to be negligible. Preferably, 16 equally spaced metallic targets are mounted on an acrylic (or other non-metallic substance) ring received within the wheel rim, as schematically represented by present FIG. 4. Alternative numbers of targets may be used, with corresponding design changes throughout the associated circuitry. Each target may comprise for example a one centimeter length of 1.9 centimeter diameter steel round stock. One target is usually distinctly marked for indexing purposes. A proximity switch such as the Model 922AA3W-A9N-L of the Microswitch Corporation of Freeport, Ill. was mounted on the sprayer frame and positioned near the target ring. Such type of proximity switch is sensitive to ferrous materials so as to be activated to produce a pulse output each time a target passes within five millimeters of the switch. In such regard, present FIG. 11 illustrates various timing signals with reference to FIG. 10, particularly with FIG. 11A representing the pulse output of such a proximity switch.

The switch may be operated in a normally open mode with a supply voltage of 12 volts DC and a load of 820 ohms. Thus, a negative edge signal transition is generated each time a target passes near the switch. The signal illustrated in FIG. 11A may also be input on line 502 to the displacement counter circuit of present FIG. 10. Such circuit generally operates by counting the time interval between counter increments, i.e. pulses from the proximity switch. Counter 504 preferably comprises a 4040 12-bit counter. With a sixteen target ring and a sprayer tire circumference of 307 centimeters, each count represents a predetermined incremental travel distance of 19.2 centimeters. The counter includes a selectable feedback line 506 for being automatically reset whenever a full 255 count is reached. Switch 508 may be alternatively manually operated to select a 5 volt input on terminal 510 so as to manually reset the displacement counter to zero at any time or spray position.

An additional 4520 counter 512 may be used in connection with the 569 Hz clock signal on line 500 to determine ground speed by measuring the time interval between displacement counter increments received on line 514. The least significant bit (D∅, see FIG. 11B) may be input on such line 514 for triggering purposes, while the full 8-bit position output may be fed via line 516 (also represented as line 234 of present FIG. 4) to a memory means or computer means. A follow on latch means 518 comprising a 4508 data latch with strobe input and 8-bit operation may also be used similar to that of the digital interface circuit for providing a speed measurement signal updated generally at each proximity switch input.

Referring now to the timing diagrams of FIGS. 11A-11C, events A-D of such figures are described as follows. Event A corresponds with the occurrence of an initial input pulse from the proximity switch on line 502. At such time, the least significant bit D∅ (FIG. 11B) of the displacement counter goes high, which closes the data latch via strobing of line 520, and triggers a 100 microsecond reset pulse via line 522 and trigger 524 (preferably comprising a monostable multivibrator 74C221). The Q output of trigger 524 comprises the reset pulse RS (FIG. 11C) which resets counter 512 so that counting may begin with the input pulse illustrated in FIG. 11A at event A.

With the speed counter 512 so enabled via line 514 and reset via line 526, the 569 Hz counting clock signal on input line 500 is counted by counter 512 until the next displacement input pulse occurs. Such reset signal 526 is schematically illustrated in present FIG. 11C.

As event C of timing diagram FIG. 11 illustrates, D∅ of the displacement counter (FIG. 11B) goes low, which disables the speed counter and opens the data latch by lines 514 and 520, respectively (opening/closing operation of data latch 518 being accomplished with the strobe input thereof as understood by those of ordinary skill in the art). With the data latch open, the 8-bit speed count on line 528 is input to the data input of latch 518. A subsequent input pulse from proximity switch on line 502, such as event D of FIG. 11, causes the least significant bit D∅ of the displacement counter to return high as illustrated in FIG. 11B, and the entire displacement/speed counter circuit cycle repeats. Accordingly, the system updates the speed data once every ⅛ wheel revolution (i.e. every other displacement count). Such ⅛ wheel revolution corresponds to a predetermined linear travel of 38.4 centimeters.

Since speed is inversely related to the speed count, the system resolution increases as ground speed decreases. At a typical sprayer ground speed of 4 kilometers per hour, the system resolution is 0.04 kilometers per hour. Thus, with a speed counter limit of eight bits (255 counts) the slowest speed that can be measured with this particular embodiment is 1.6 kilometers per hour. Such 8-bit speed output may be fed through 8-bit line 530 to a digital data system, such as also represented by line 236 of present FIG. 4.

While virtually any digital data system may be used in accordance with the present invention, a portable microcomputer, the Portable PC by the IBM Corporation of Armonk, N.Y., may comprise one preferable embodiment. As represented in FIG. 4, six different parallel 8-bit representations of distance data outputs are continuously present as input to the computer 212 of present FIG. 4, with two parallel lines 234 and 236 representing mobile unit displacement and speed digital representations, respectively. Such eight digital channels may be supplied to the additional data system through additional interface cards such as the Model PI012 by the Metrabyte Corporation of Tauton, Mass. Each such interface card is capable of handling three data ports. Various data port address assignments may be made in accordance with the present invention, and programming of the computer means 212 readily accomplished by those of ordinary skill in the art in accordance with the operating criteria set forth herein, such as in FIGS. 12 and 13.

Figure 12:
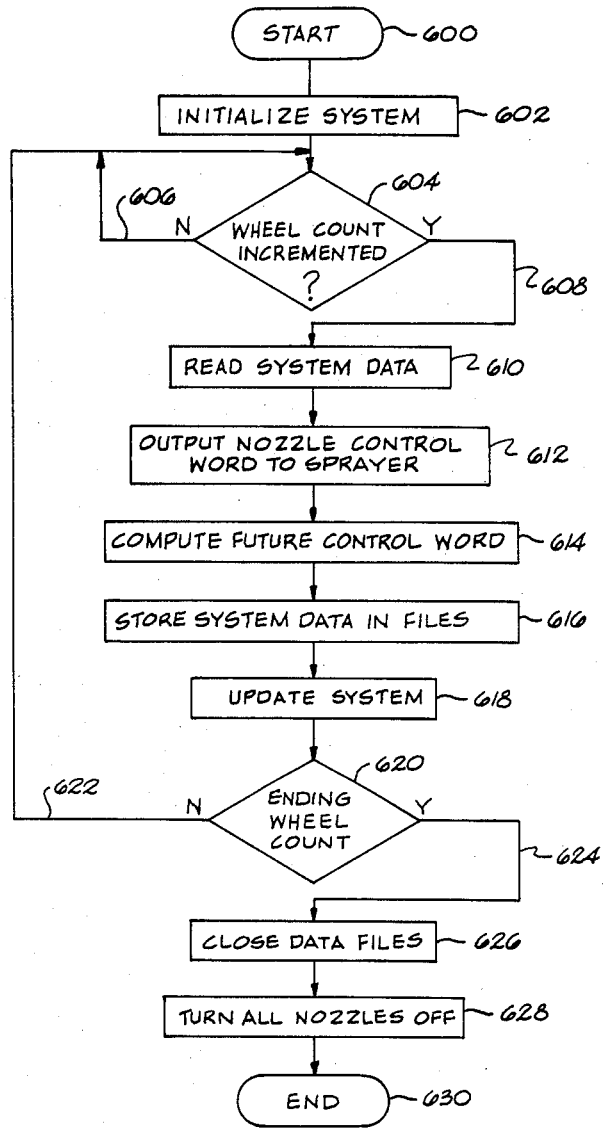
FIG. 12 represents an overall systems management flow chart in accordance with aspects of this invention.
Figure 13:
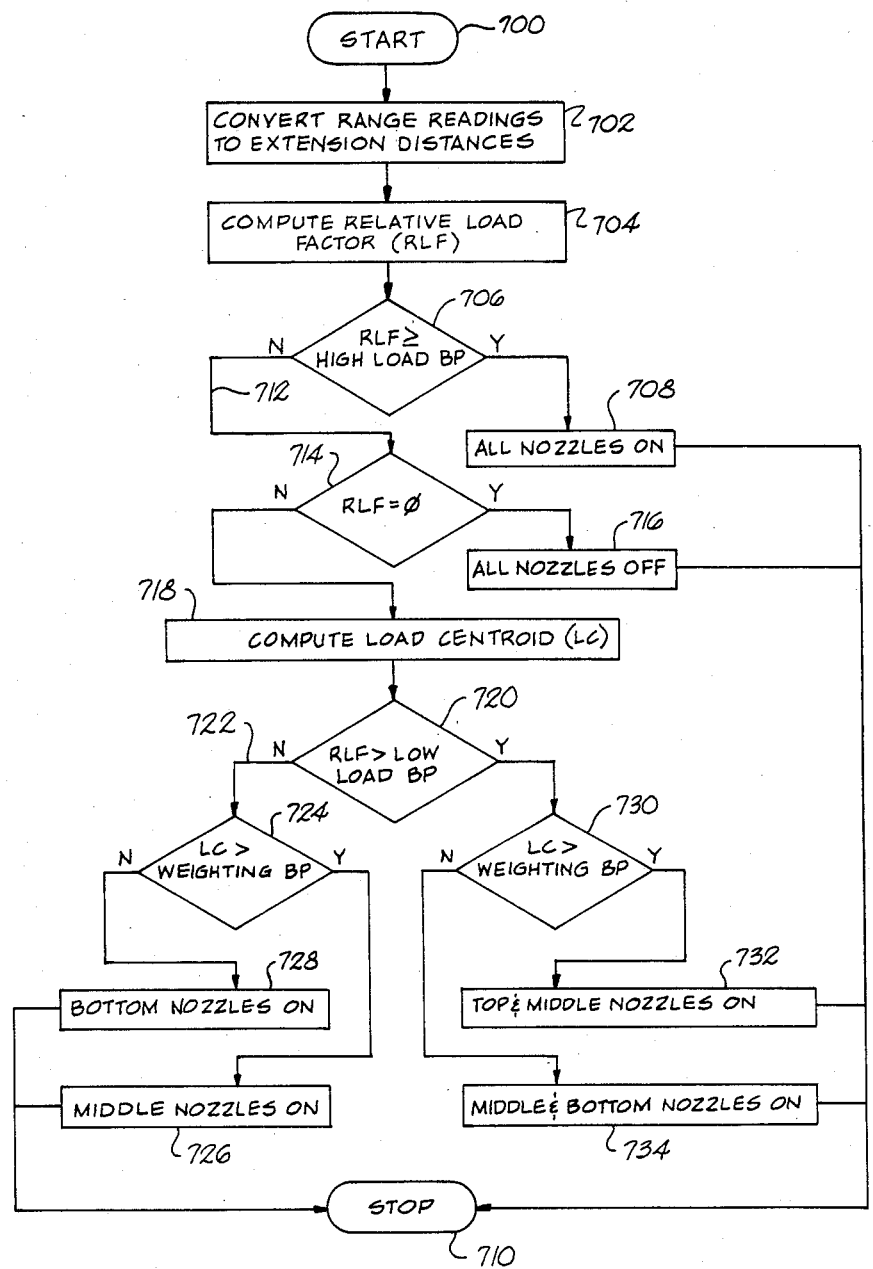
FIG. 13 illustrates an exemplary manifold configuration selection process flow chart in accordance with various aspects of this invention, and particularly for providing an example of the "compute future control work" step of the flow chart of present FIG. 12.

In particular, present FIGS. 12 and 13 illustrate general flowchart outlines of various aspects of the present method. Present FIG. 12 generally comprises a system management overview, while present FIG. 13 more particularly is concerned with a manifold configuration selection process in accordance with this invention. Disclosure of these two specific exemplary flowcharts is not intended as limiting embodiments of the present method or apparatus to inclusion of spray nozzle control, since the broader aspects of this invention are also more generally directed to a sensing method and apparatus in accordance with this invention, as discussed throughout above. Referring now to present FIG. 12, one overall system management which may be preferably practiced is diagrammatically indicated. After system start-up 600, initialization 602 is undertaken in which the eight inputs of computer 212 described above are assigned appropriate ports for the computer control register. Also, appropriate control words for manifold control are loaded to turn all manifold nozzles off. The exemplary flowcharts of present FIGS. 12 and 13 are generally concerned with sensing on one side of an orchard sprayer, and control of a corresponding single set of controllable nozzles (with a top, middle, and bottom respective nozzle comprising such set), but the concepts therein may be readily applied to separately control two (or more) sensor/control nozzle sets situated on opposite sides of a sprayer.

As discussed above, the entire control system of the present invention is preferably driven (i.e. activated) by vehicle displacement signals which may be obtained through a wheel displacement counter. Such an arrangement allows the system to function consistently regardless of ground speed, and eliminates the need for time-based operations between distance determining means and computer means. Ground speed is not explicitly used in the exemplary control algorithms described specifically herein, but may be readily integrated thereto without departing from the spirit and scope of this invention.

Returning to the flowchart of FIG. 12, operation proceeds from the initialize system step 602 to a decision block 604. In such decision block, a check is made to see whether a wheel count has been incremented, i.e. whether a proximity sensor signal has been received. Since the computer or equivalent means preferably operates independently of the measurement cycle operation of the distance determining means, loop 606 cooperates with decision block 604 to continuously question whether a proximity sensor signal has been received, until such signal is received. Once a wheel count increment takes place, line 608 is followed to step 610, in which all of the system data is read. In other words, at least a set of distance data outputs from the respective top, middle, and bottom distance detection means on one side of a mobile unit are read (and optionally stored for later processing thereof). As represented in FIG. 4, the displacement data and speed data are also available and may optionally be read (and stored) at this time.

The exemplary flowchart of FIG. 12 preferably operates with a nozzle configuration logic stack, in which future spray nozzle configuration control words are stored in a stack and sequentially used as the spray nozzle means subsequently pass by the vertical sectors of the target trees used to generate such control words. Generation of a control word is discussed in greater detail below with reference to present FIG. 13.

The nozzle configuration logic stack is preferably operated by first using the next output word thereof (step 612) to control a sprayer (where such optional sprayer control is being practiced in accordance with this invention). Operation then proceeds to step 614 in which an empty space in the logic stack created by incremental advancement of the remaining control words stacked therein is filled by computing a future control word based on the system data most recently read in step 610.

Using the example of the aforementioned timing, a complete control cycle is performed every predetermined incremental distance of 19.2 centimeters as an orchard row is passed or sprayed. Since the sensor mast is preferably mounted about 80 centimeters forward of the sprayer blower outlet (which serves to remove the sensors from the vibration and moisture of any spray outlet), distance data readings are taken before any target foliage is perturbed by the air-blast sprayer. In view of such mounting separation and the exemplary predetermined incremental travel distance, a logic stack of four nozzle control words is preferred. During each control cycle of the FIG. 12 flowchart, the control word stored at the bottom of such stack are written out to a nozzle control port (step 612), the remaining words are moved respectively down the stack one position, and a newly computed control word placed on top of the stack (step 614).

Continuing with subsequent operations in FIG. 12, step 616 is optionally included to store all system data in memory files for later processing in accordance with the present invention, as discussed more particularly above. Step 618 refers to various housekeeping functions well understood by those of ordinary skill in the art without detailed discussion thereof herewith, such as adding an incremental count to the continuous wheel count.

When being practiced in an orchard sprayer control configuration, the present invention is preferably run "open-ended", i.e. without any particular ending run length. However, particularly if the features of the present invention are used only to map the tree foliage of a given length of trees in an orchard row, an ending wheel count decision block 620 may be used to determine when the desired horizontal length of the rows have been traversed, keeping in mind that each wheel count refers to a predetermined incremental distance of travel for the mobile unit. As indicated by the "NO" decision line 622, the flowchart returns to the lead input for decision block 604 if the ending wheel count has not been reached at the end of each cycle of operation for the flowchart of FIG. 12. If the ending wheel count has been met, as represented by flow line 624, the data files (when used) may be closed in step 626, and a control word may be entered to turn all nozzles off in step 628, with the flowchart ending in step 630.

To generally summarize the systems management approach of FIG. 12, each control cycle thereof is began (based on identifying a wheel count increment) by reading all data input and storing the values in program variables. The nozzle manifold control word on the bottom of the configuration logic stack is then written to a nozzle control board. By reading input data before changing the nozzle control, electrical interference between the solenoid valves and the input lines may be minimized. Current sensor readings are then used by the manifold selection process (see FIG. 13) to obtain a nozzle control word to be implemented four cycles later. The system status data of displacement count, speed count, the six distance data output readings, and the current control word in the nozzle control port, as well as the newly computed control word, may then be written to an output data file. The control word stack is updated by moving the current contents down one position and placing the new (i.e. latest) control word on top thereof.

Referring now to present FIG. 13, the "compute future control word" step 614 of present FIG. 12 is discussed in detail. As discussed above, the preferably three independently-controllable nozzle means on each side of a sprayer permit eight different manifold configurations. Four relative levels of spray output are possible; no nozzles, one nozzle, two nozzles, or three nozzles. Within both the one and two nozzle output levels, three possible manifold configurations exist. Present FIG. 13 incorporates a general use algorithm, which may be adjusted for any particular target crop by altering the values of seven user-defined parameters, as discussed hereinbelow. Loading of such seven user-defined parameters in the system also forms part of the initialize system step 602 of present FIG. 12.

One general objective of the manifold selection process is to utilize distance data outputs from each of the sensors mounted on a sprayer side common with that of the manifolds so as to be selected, to determine what manifold configuration should be activated for optimal application of select materials to the sensed target trees. Each distance data output corresponds to the distance (in digital counts) from the respective ultrasonic transducer means to the nearest tree foliage outward therefrom. Thus, one of the initial tasks of the predetermined flowchart after start-up step 700 thereof is to convert such distance data outputs to more useful target information.

One of the above-mentioned user-defined parameters is the known (or determinable) tree row-to-row spacing distance in a given orchard. An assumption is made that the sprayer substantially travels parallel to and relatively equidistant between such rows. By subtracting a given data output from one-half of such user-defined row spacing, and adjusting for any sensor to sprayer centerline offset, a foliage extension distance (FED) may be determined. In step 702, such data outputs (i.e. range readings) are converted to foliage extension distances (FED's) for each of the respective top, middle, and bottom ultrasonic detection means locations. Each FED represents the distance which the tree foliage extends outward from the tree centerline towards the spray apparatus at such vertical location. Therefore, such extension distances may be directly related to the foliar volume in the full vertically-oriented sector of measurement.

Once the respective top, middle and bottom FED's are calculated in step 702, the relative load factor for such set of data is computed in step 704. Relative load factor (RLF) comprises a defined primary target description parameter and is used in connection with determining the relative amount of the target load centroid sensed with the ultrasonic detection means. The RLF is computed by dividing a relative load (RL) with a defined full load (FL). The relative load comprises the summation of the set of three FED calculations from step 702, while the full target load is defined as the sum of three user-defined parameter full FED's. In other words, a user preferably views the orchard or target trees to be sensed, and assigns corresponding full FED values for each of the three vertical positions.

Thus, the relative load factor RLF is equal to the summation of the three sensed FED's for a given set divided by the summation of the three full FED's determined from the user-defined parameters. In one given example for peach trees where row spacing was 6.1 meters, full top extension and full middle extension values of 2.5 meters was established, with a full bottom extension of 2.0 meters. In an apple orchard test where a row space of 6.1 meters was determined, extension values of 1.5 meters were used for the top, middle, and bottom extensions.

Since RLF represents some fraction of a full target load present in a given vertically-oriented sample sector, it may be used to determine the number of the three nozzle manifolds to be activated. Two additional user-defined parameters, high load breakpoint (HBP) and low load breakpoint (LBP) may be used to classify the computed RLF. Progressing to decision block 706, if RLF equaled or exceeded the high load breakpoint, in one example established as 0.70, then a control word corresponding to activation of all three nozzle manifolds is produced in step 708, and the flow chart proceeds to the stop position 710 thereof.

Whenever RLF is less than HBP, as represented by flow line 712, an additional decision block 714 is used to determine whether RLF equals zero. If it does, a control word indicative of all nozzles being turned off is generated in step 716, and the flowchart of FIG. 13 is once again completed for a given "compute future control word" operation of the FIG. 12 flowchart. However, if RLF is not equal to zero, then a load centroid (LC) computation is undertaken beginning with step 718 for determining the relative vertical distribution of the sensed target foliage in a given vertically-oriented sector.

Because of determinations which may be made in connection with deposition test results (as discussed with reference to present FIG. 3), certain possible permutations of nozzle activation are preferably eliminated by the remainder of the control algorithm discussed with reference to FIG. 13. For example, because of the generally poor deposition results associated with the top position of the material distribution means (i.e. spray nozzle means), the top nozzle means is never turned on by itself whenever a decision to turn on only one set of nozzles is made. Likewise, whenever two nozzles are to be activated in a given configuration, the top nozzle means is never activated in combination with the bottom nozzle means.

Computation of the load centroid may be viewed as the use of a secondary target description parameter for spatially evaluating the vertical distribution of the sensed target load. Whenever the process of the flowchart of FIG. 13 reaches step 718 thereof, it is indicative of a decision that either one or two of the manifolds are to be activated for spraying a given vertically-oriented sector, but the decision as to what configuration of manifold activation is optimal is yet to be determined. The remainder of the flowchart of FIG. 13 beginning with step 718 provides the requisite additional levels of decision.

Computation of the load centroid in step 718 is begun by first calculating a weighting factor for the respective FED's for the top and bottom sensors from a given set of such data outputs as obtained in step 702. A weighting factor for the respective top FED is obtained by dividing such top FED by the calculated relative load (RL) from step 704. Such calculated relative load corresponds with the summation of the three FED's calculated in step 702. Similarly, a weighting factor for the respective bottom FED is calculated by dividing such bottom FED with the same relative load (RL) for such set of FED's. Such bottom weighting factor is then subtracted from the top weighting factor to obtain the load centroid. Obviously, the load centroid (LC) may vary from $-1.0$ for a completely bottom sensor load to 0 for a load centered about the middle sensor to $+1.0$ for a load completely at the top sensor.

Exiting step 718 with the calculated load centroid, the relative load factor RLF determined in step 704 is compared with one of the user-defined parameters, the low load breakpoint (LBP), which for example was established as 0.35 for certain trial runs of embodiments of the present invention. In other words, if the relative load factor is less than 35% relatively speaking of a full load, then flowchart decision block 720 branches to line 722 so as to select which one of the nozzle means will be activated. As indicated above, the possibility of activating only the top nozzle is preferably excluded based on the empirical deposition tests discussed with reference to present FIG. 3.

The computed load centroid (i.e. the determination of the relative vertical distribution of the sensed target load) is compared with another user-defined parameter known as the weighting breakpoint, with one example thereof being 0.60. If the vertical distribution information represented by the load centroid compares in decision block 724 with such weighting breakpoint so as to exceed same, then a control word is output in step 726 for an activation configuration which turns on only the middle grouping of nozzles. However, if the load centroid is not greater than the weighting breakpoint, then activation of the bottom grouping of nozzles only is indicated with step 728.

If however the relative load factor calculated in step 704 is greater than the low load breakpoint (step 720), then the computed load centroid is compared with the weighting breakpoint in decision block 730 to determine which two nozzles or two grouping of nozzles will be activated. Whenever the load centroid exceeds the weighting breakpoint vertical distribution of the sensed target load is determined to be relatively upward, so that step 732 indicates for the top and middle nozzles to be activated. However, if decision block 730 results in a determination that the relative vertical distribution of the sensed target load is more downward, then the middle and bottom nozzles are selected for activation in step 734.

In each instance, completion of steps 708, 716, 726, 728, 732, or 734 results in completion of the FIG. 13 flowchart and computation of the future control word for step 614 of FIG. 12, which causes such future control word to be entered into the configuration logic stack (as discussed above) for subsequent use in activating spray nozzles as they are transported past the vertically-oriented sector of the target trees used in generation of such nozzle control word.

In general, row-to-row spacing is easily measured directly in the orchard so that the corresponding user-defined parameter therefor may be obtained. Full foliage extension distances may be subjectively chosen based upon scouting various blocks or areas of a given orchard in which the present invention is to be practiced. The various exemplary breakpoints indicated above may be based on given spray deposition tests for a particular nozzle configuration. For example, selecting the high load breakpoint of 0.70 ensures a conservative approach to spray control. In other words, if relative target volume is only 70% or higher than the defined full load, then the full spray output is activated. Such selection of a high load breakpoint compensates for potential errors which might result in under-indication of the amount of tree foliage.

Likewise, the low load breakpoint is preferably selected as about 0.35 or 35% of the defined full foliage load so that two-thirds of the full spray output will be activated if as much as 35% of the defined full foliage load is detected. Load detection of 0 to 35% results in only a single nozzle member being activated. Therefore, a conservative approach was used throughout the control algorithm in defining the various range breakpoints.

Based on test results with given embodiments of the present invention using such exemplary parameter values, spray volume savings were noted of generally between 28% and 52% in comparison with no spray control at all. Full control in accordance with the present invention was also compared with simplified control, such as prior art intermittent systems, and marginal savings with the present invention over such prior art intermittent control systems resulted in savings of generally between 15% and 25%.

While various specific and exemplary embodiments of both methods and apparatus in accordance with the present invention have been disclosed herewith, numerous modifications and variations to same may be practiced by those of ordinary skill in the art without departing from the spirit and scope of the present invention. For example, various ground speeds may be used virtually without limitation since the ultrasonic detection mean units are triggered independently from any displacement sensing. Also, orchard sprayer control (i.e. material application control) need not be practiced with every embodiment, but the generation of orchard profiles and maps may instead be used for various crop management applications, such as monitoring tree growth throughout the season and locating missing or abnormal trees. Similarly, predictions of orchard yield or profitability could be based on such orchard maps, with all such non-spraying applications of various embodiments of the present measurement system being included as embodiments of this invention.

While exemplary embodiments of this invention were field tested using nine identical sprayer nozzles (controlled in groups of three), various distinguished nozzles may be utilized, and the controllable sprayer nozzle configurations improved. Even non-symmetrical nozzle arrangements may be developed, with the spatial relationship (for example, empirically determined as with reference to FIG. 3) of such nozzle configurations being compared with the relative amount and vertical distribution of sensed target loads to determine optimal application of materials to such sensed target loads, all without departing from the spirit and scope of the present invention.

Another exemplary variation which may be practiced in accordance with this invention is that the optimal defined load extension distances could be alternatively determined by using results from the foliar measurement system itself, as opposed to relying solely on user-defined parameter inputs. In other words, an electronic rather than a manual scouting process could be practiced.

Additionally, while a particular microcomputer was utilized in field testing of the present invention, the sensing and control systems were designed for use with any processor having digital input/output capabilities. No timing or analog-to-digital operations are required with a microcomputer, and accordingly same may be readily replaced with a dedicated processor which could result in increased overall system durability and reduced systems cost.

The foregoing language and particulars used in describing exemplary embodiments is intended as words of example only, and is not intended as words of limitation in describing the present invention, which are instead set forth more particularly in the appended claims.

What is claimed is:

1. Apparatus for obtaining distance data between the apparatus and a plurality of target trees aligned in a row, while being transported past such trees, said apparatus comprising:

distance determining means for independently operating in cycles to sense respectively the distances between different vertical locations on said apparatus and the nearest tree foliage therefrom of a target tree situated in a row of such trees along which said apparatus is transported, and for providing respective distance data outputs corresponding with each of said different vertical locations, which outputs are updated for each cycle of distance determining means operation;

transport displacement sensing means for outputting an incremental distance signal indicative of said apparatus being transported a predetermined incremental distance relative a row of target trees; and data storage means, adapted to receive said respective distance data outputs and said incremental distance signal, for orderly storing of said respective distance data outputs for the respective current cycle of distance determining means operation occurring at the time of each incremental distance signal, whereby such orderly stored data outputs may be subsequently processed with respect to said predetermined incremental distance to obtain profiles of foliar volumes for a plurality of sensed target trees.

2. An apparatus as in claim 1, wherein said distance determining means includes:

a plurality of ultrasonic transducers respectively mounted at said different vertical locations, and generally directed horizontally and outward from said apparatus on a common side thereof adjacent the row of target trees to be sensed; and ultrasonic transducer driver and timing means for consecutively operating each of the respective transducers in a pulse/echo mode of operation, with a respective delay time for the return of each echo being directly proportional to the distance between the respective transducer and the nearest tree foliage outward therefrom, with a single operation of all of said ultrasonic transducers collectively comprising a single cycle of distance determining means operation.

3. An apparatus as in claim 2, wherein said plurality of ultrasonic transducers comprise two separate sets of same, with each set being directed outward from opposite sides of said apparatus and being operated independently of each other as such sets so that rows of target trees on opposite sides of said apparatus may be simultaneously sensed.

4. An apparatus as in claim 3, wherein said data storage means further includes means for determining said foliar volume profiles based on said stored data outputs by subtracting the respective distance data from one-half of the spacing between adjacent rows of target trees between which said apparatus is transported, and then compensating for any displacement of a respective transducer from the center of the apparatus.

5. An apparatus as in claim 4, wherein said data storage means further includes means for determining the relative size and vertical location of sensed foliar volumes.

6. An apparatus as in claim 5, further comprising:

a plurality of individually controllable spray mechanisms, arranged in respective sets directed outward from said opposite sides of said apparatus for simultaneously spraying rows of such target trees on either side thereof, said spray mechanisms having respectively unique spray patterns for applying chemicals to the target trees; and wherein the respective spray mechanism sets are controlled responsive to distance data outputs corresponding with the respective side of said apparatus for that set so that an appropriate configuration of spray mechanisms are actuated for optimal application of spray materials based on the relative size and vertical location of the sensed foliar volumes, and the determined distance between such volumes and said apparatus.

7. An apparatus as in claim 1, wherein a cycle of distance determining means operation is much shorter than the time required for said apparatus to be transported said predetermined incremental distance, whereby continuous independent operation of said distance determining means in combination with operation of said data storage means responsive to the occurrence of each incremental distance signal permits utilization at all times of the most recent measurement cycle distance data outputs as input for said data storage means, without requiring critical timing circuitry between said data storage means and said distance determining means.

8. An apparatus as in claim 7, wherein said distance determining means includes a digital interface circuit for interconnection with said data storage means, said digital interface circuit including data latch means for continuously receiving respective distance data outputs for successive distance determining means operating cycles, and for latching onto the current cycle distance data outputs corresponding to the occurrence of each incremental distance signal, whereby the latched distance data outputs are available to be stored by said data storage means.

9. An electronic measurement system adapted for mapping the foliar volume of target trees situated in an orchard having a plurality of rows of such target trees with a generally predetermined amount of separation between adjacent rows, such system adapted to be mounted on a mobile unit which may be propelled generally equidistant between adjacent rows of target trees, said system comprising:
- a displacement sensor, associated with at least one wheel of such a mobile unit, for outputting a displacement signal indicative of a predetermined amount of angular rotation of such wheel, which rotation corresponds with a predetermined incremental displacement of said system relative rows of target trees;
- clock means for providing a clocking signal of predetermined frequency;
- speed counter means, responsive to said displacement signal and said clocking signal, for outputting a speed signal indicative of the speed of the mobile unit relative rows of target trees, such speed signal being updated based on the occurrence of each displacement signal;
- a plurality of ultrasonic transducer means generally situated respectively at various vertical positions relative the mobile unit;
- ultrasonic transducer driver and interface means for operating each of said transducer means in a pulse/echo mode to determine the distance outward therefrom to the nearest target tree foliage, and for outputting in parallel a plurality of respective distance data outputs corresponding respectively with the determined distance for each of said plurality of transducer means, which respective outputs are updated to define a set thereof for each given cycle of driver and interface means operation;
- data memory means, responsive to the occurrence of each displacement signal, for storing corresponding sets of said plurality of respective distance data outputs for each current cycle of driver and interface means operation at the occurrence of a displacement signal, and for storing together therewith such displacement signal and its corresponding updated speed signal; and
- data processing means for processing such ordered sets of data outputs and their corresponding displacement and speed signals to obtain mapping of the foliar volume of sensed target trees.

10. A system as in claim 9, wherein:
- said ultrasonic transducer means are divided into two separately operated sets thereof, each set thereof having transducer means respectively situated at said various vertical positions, collectively directed away from opposite sides of the mobile unit so as to simultaneously operate for sensing tree foliage on rows of target trees on each side of the mobile unit; and
- wherein said ultrasonic transducer driver and interface means operates said transducer means in the two operatively separated sets thereof.

11. A system as in claim 9, wherein said data processing means includes initialization means for receiving primary and secondary target description parameters for comparison with the foliar volumes of sensed target trees.

12. A system as in claim 11, wherein said primary target description parameter is used in determining the relative amount of foliar volume for sensed target trees, and the secondary target description parameter is used in determining the vertical distribution of the foliar volume of sensed target trees.

13. A system as in claim 12, further comprising:
- a plurality of separately actuatable material application means for applying select materials to the rows of target trees upon actuation, said application means each having a known material application trajectory relative the row of target trees, which trajectories differ among said application means; and
- wherein said data processing means includes means for selecting particular material application means for actuation thereof so as to form an optimal application configuration for a given foliar volume of sensed target trees based on the known trajectories of the material application means and the relative amount and vertical distribution of such given foliar volume together with the determined distance thereof from said transducer means.

14. A system as in claim 13, wherein said select materials comprise one of: concentrated liquid chemicals including an active ingredient which are mixed with a liquid carrier such as water at the time of application; a pre-mixture of liquid chemicals including an active ingredient and a carrier such as water; granular fertilizers; lime; or other soil enhancers.

15. An apparatus adapted for controlling the application of select materials to respective target trees arranged in generally regular, equidistant rows forming an orchard, said apparatus comprising:
- a mobile unit adapted to be conveyed between adjacent rows of such target trees along a travel path generally parallel to such rows and equidistant therebetween, said mobile unit including holding means supported thereon for holding materials to be controllably applied to such target trees;
- mobile unit displacement sensor means for detecting a predetermined incremental displacement of said mobile unit relative the rows of target trees, and for outputting an incremental movement signal indicative thereof;
- a plurality of individually controllable material distribution means, supported on said mobile unit for movement therewith, for outputting materials fed thereto from said holding means towards target trees situated generally laterally from the axis of said travel path for said mobile unit, each of said distribution means having a generally determinable material distribution pattern, the spatial characteristics of which differ for each distribution means and which vary depending on the distance outward from the respective distribution means;
- a plurality of ultrasonic distance detection means, situated at predetermined respective vertical heights on said mobile unit and forwardly thereon relative said material distribution means with respect to the direction of travel of said mobile unit, for being operated in common measurement cycles to output for each such cycle a set of respective distance data signals indicative of a pulse/echo range reading of the distance between each respective ultrasonic distance detection means and the nearest target tree foliage generally outward therefrom; and
- material distribution means control means, operatively associated with each of said material distribution means for selectively and respectively actuating same, and responsive to said incremental movement signal for reading the most current measurement cycle set of respective distance data signals from said plurality of ultrasonic distance detection means, calculating relative size and vertical location of target tree centroids based on such most current set of respective distance data signals, and subsequently individually controlling actuation of each of said plurality of material distribution means for optimum material application to the sensed target trees based on the spatial relationship of the calculated target centroids to the material distribution patterns of said distribution means.

16. An apparatus as in claim 15, wherein:
said holding means comprises a tank for holding liquid chemicals therein;
said displacement sensor means includes a plurality of actuation elements evenly spaced about a wheel of said mobile unit, and an actuation element sensor fixedly mounted on said mobile unit so as to be periodically operated by the passage of said actuation elements thereby;
said material distribution means comprises respective solenoid-actuated spray nozzles; and
said distribution means control means includes respective solenoids for each of said spray nozzles for actuating same, said solenoids being operated by said control means to define a selected configuration of actuated spray nozzles resulting in optimal material application to sensed target trees.

17. An apparatus as in claim 15, further comprising drive sequencing means for preventing simultaneous pulse/echo operation of ultrasonic distance detection means on a common side of said mobile unit, so as to avoid interference among respective sensing operations thereof.

18. An apparatus as in claim 15, further comprising:
digital interface means for continuously accepting sets of respective distance data signals for successive common measurement cycles of said distance detection means, and for latching onto the most current cycle set of data signals and outputting same to said control means responsive to the occurrence of said incremental movement signal, whereby said ultrasonic distance detection means and said digital interface means may be operated independently of said control means so as to minimize circuitry limitations on the speed with which said mobile unit may be conveyed between adjacent rows of target trees.

19. An apparatus as in claim 16, wherein each of said solenoids correspond with and respectively control a single spray nozzle.

20. An apparatus as in claim 16, wherein each of said solenoids respectively correspond with and control a plurality of grouped spray nozzles, which collectively define the respective material distribution pattern for each such solenoid.

21. An orchard sprayer with automatically-controlled spray function comprising:
a trailer adapted to be drawn generally equidistant between adjacent rows of orchard trees having a substantially predetermined fixed spacing therebetween;
a tank for holding chemicals to be applied to the orchard trees, said tank being supported on said trailer for movement therewith;
pump means and hose means for pumping chemicals from said tank;
a plurality of nozzles directed at respective different angles generally laterally outward from at least one common side of said trailer for spraying orchard trees along which said trailer may be drawn;
an individually controllable flow valve for each of said nozzles, said hose means being connected with each of said flow valves so that actuation of a given flow valve permits passage of said chemicals to its respective nozzle;
a trailer wheel rotation sensor for outputting displacement signals indicative of predetermined increments of travel of said trailer relative the orchard trees;
air-blast means, associated with said nozzles for continuously outputting air under pressure therethrough, such pressurized air outputting chemicals from said nozzles in respective determined spray patterns whenever the respective flow valves of the nozzles are actuated;
a plurality of ultrasonic transducers, situated on said trailer generally forward of said nozzles with respect to the axis of travel of said trailer, arranged respectively at various vertical heights relative said trailer, and directed generally outward from said common side thereof;
transducer driver means for separately driving each of said transducers in a pulse/echo mode and for outputting respective measurement initiation pulse and return ultrasonic echo signal pairs for each of said transducers in a common measurement cycle thereof, said ultrasonic echo signals being returned to their respective transducers as reflections from the nearest orchard tree foliage outward therefrom;
clock means for providing a clock signal of predetermined frequency;
digital interface means, responsive to said pulse/echo signal pairs and said clock signal, for outputting digital representations of delay times between the signal pairs which directly correspond to distances between each of the respective transducers and the nearest orchard tree foliage outwardly therefrom, said distances for each of said transducers being updated for each common measurement cycle thereof;
flow valve control means, operative independently of said common measurement cycle, for responding to said displacement signals to obtain said digital distance representations of said respective transducers for the current measurement cycle thereof occurring at each predetermined increment of trailer travel, and subsequently controlling said flow valves based thereon.

22. An orchard sprayer as in claim 21, wherein said flow valve control means further includes:
means for converting said digital distance representations to foliage extension distances based on the predetermined fixed spacing between adjacent rows of the orchard trees;
means for calculating the amount of relative target load based on said foliage extension distances and given standard values therefor corresponding with a defined standard tree;
means for calculating the vertical distribution of the target load based on selected of said foliage extension distances and said given standard values; and means for determining a configuration of nozzles to permit the passage of chemicals thereto by actuation of their respective flow valves for preselected optimal application of chemicals to a given target load, based on the calculated relative amount and vertical distribution of such given target load;

whereby the spatial relationship between spatially characterized target loads and determined chemical spray patterns for respective nozzles may be used to control respective flow valves for optimally applying chemicals to such target loads.

23. An orchard sprayer as in claim 22, wherein said means for determining a configuration of nozzles includes a configuration logic stack for stacking commands for subsequent control of said nozzle configuration, the input of said stack comprising a future command, for nozzle configuration timed for control of said nozzles whenever they are advanced to the corresponding target load used to generate such future command and the output of such stack comprising a previously determined nozzle configuration based on prior sensing of a given target load to which said plurality of nozzles are presently advanced, said stack being configured for step-wise operation at each predetermined increment of trailer travel with a predetermined spatial relationship between the input and output of such stack so that said nozzles are controlled for spraying given orchard trees based on target load calculations corresponding with such given orchard trees.

24. An orchard sprayer as in claim 21, further comprising a plurality of vertical masts for supporting said transducers at said various vertical heights thereof, said masts collectively comprising a vertical assembly which may be slidably positioned along a pair of longitudinal rails disposed on opposite sides of said tank, whereby the separation of said ultrasonic transducers from said nozzles may be adjusted.

25. An orchard sprayer as in claim 21, wherein said nozzles are grouped together in respective sets of three with each such set being controlled by an individual flow valve, and with said sets of nozzles collectively generating the respective determined spray pattern under control of their respective flow valve.

26. A method for obtaining distance data between an apparatus and a plurality of target trees aligned in a row, said method comprising the steps of:

providing an apparatus with a plurality of distance determining means situated at discrete vertical locations thereon for sensing the distance between such locations and the nearest tree foliage therefrom of a target tree situated in a row of such trees;

transporting such apparatus along such row of target trees;

independently operating said distance determining means in repetitive common cycles to sense the distances between their respective vertical locations and the nearest tree foliage therefrom;

producing respective distance data outputs corresponding with sensed distances for each of said locations, said outputs being updated for each cycle of distance determining means operation;

detecting each time said apparatus is transported a predetermined incremental distance relative the row of target trees; and orderly storing said respective distance data outputs for the respective current cycle of distance determining means operation occurring each time said apparatus is transported said predetermined incremental distance, whereby such orderly stored data outputs may be subsequently processed with respect to said predetermined incremental distance to obtain profiles of foliar volumes for a plurality of such sensed target trees.

27. A method as in claim 26, further comprising the step of processing said foliar volume profiles in comparison with a first given parameter to determine respective relative amounts of foliar volumes sensed at each predetermined incremental distance of apparatus transport.

28. A method as in claim 27, further comprising the step of processing said foliar volume profiles in comparison with a second given parameter for determining the vertical distribution of the respective foliar volumes sensed at each predetermined incremental distance of apparatus transport.

29. A method as in claim 28, further comprising the steps of:

providing a plurality of controllable material distribution means supported on said apparatus for movement therewith along the row of target trees;

determining the respective material application patterns for each of said application means; and controlling actuation of the respective application means in accordance with the determined relative amount and vertical distribution of said foliar volume profiles in relation with the determined distribution patterns of said application means for establishing an optimal application with same.

30. A method as in claim 26, wherein:

said providing step includes providing two sets of said plurality of distance determining means, one on each side of said apparatus and directed generally outward therefrom for sensing distances relative corresponding rows of target trees on either side of said apparatus; and said orderly storing step includes the step of storing in separate sets corresponding with the given row of target trees respective distance data outputs from distance determining means for each side of said apparatus.

31. A method for controlling the application of select materials to respective target trees arranged in generally regular, equidistant rows forming an orchard, said method comprising the steps of:

providing a mobile unit having a holding means supported thereon for holding materials to be controllably applied to such target trees, and further having a plurality of individually controllable material distribution means for outputting materials fed thereto from said holding means towards target trees situated generally laterally from a travel path axis for the mobile unit, each of said distribution means having a generally determinable material distribution pattern of spatial characteristics which differ for each distribution means and which vary depending on the distance outward from the respective distribution means;

providing said mobile unit with a plurality of ultrasonic distance detection means, situated at predetermined respective vertical heights on said mobile unit and forwardly thereon relative said material distribution means with respect to the forward direction of travel for said mobile unit;

operating said ultrasonic distance detection means while conveying said mobile unit between adjacent rows of such target trees along a travel path generally parallel to such rows and equidistant therebetween, so that said ultrasonic distance detection means are operated in common measurement cycles to output for each such cycle a set of respective distance data signals indicative of a pulse/echo range reading of the distance between each respective ultrasonic distance detection means and the nearest target tree foliage generally outward therefrom;

at each occurrence of a predetermined incremental displacement of said mobile unit relative the rows of target trees, reading the most current measurement cycle set of respective distance data signals from said plurality of ultrasonic distance detection means; calculating relative size and vertical location of target tree centroids based on such most current set of respective distance data signals; and subsequently individually controlling actuation of each of said plurality of material distribution means for optimum material application to the sensed target trees based on the spatial relationship of the calculated target centroids to the material distribution patterns of the material distribution means.

32. A method as in claim 31, wherein said materials to be applied includes one of pre-mixed liquid chemicals or direct injection liquid chemicals.

33. A method as in claim 31, wherein said materials to be applied comprises one of granular fertilizers, lime, or other soil enhancers.

34. A method as in claim 31, wherein:
said mobile unit comprises an air-blast type orchard sprayer; and
wherein said method further comprises the steps of
providing ultrasonic distance detection means on each respective side of said orchard sprayer directed generally outward therefrom in a direction generally perpendicular to the travel axis path of said orchard sprayer, so that adjacent rows of target trees oppositely disposed on each lateral side of said orchard sprayer may be simultaneously sensed; and
providing individually controllable material distribution means on each of said sides of said orchard sprayer, corresponding with respective sets of said ultrasonic distance detection means, for controllably applying optimum material to each of the respective rows of trees in accordance with target tree sensing from the distance detection means corresponding with such row.

35. A method as in claim 31, wherein said common measurement cycles are relatively shorter than the time necessary for said mobile unit to traverse said predetermined incremental displacement thereof, whereby the most current distance data signals are always used to calculate relative size and vertical location of said target tree centroids for controlling actuation of said material distribution means.

36. A method as in claim 31, wherein said step of calculating said relative size and said vertical location of said target tree centroids includes:

comparing relative load factor, defined as a summation of foliage extension distance values divided by corresponding given values thereof for a defined standard full foliage target tree, with a given primary target description parameter for determining the relative amount of the target centroid load; and computing a load centroid, defined as a top position ultrasonic detection means foliage extension distance divided by the summation of all foliage extension distances minus a bottom position ultrasonic distance detection means foliage extension distance divided by such summation of all foliage extension distances, and comparing said computed load centroid with a given secondary target description parameter for determining vertical location of a respective target load centroid.

37. A method as in claim 31, wherein:
said plurality of individually controllable material distribution means comprise a vertically situated array of a relative bottom, middle, and top nozzle means; and
said actuation controlling step includes selecting an appropriate configuration of operative nozzle means to obtain said optimum material application therewith.

38. A method as in claim 37, wherein the various configurations of said nozzle means include actuation of one of the following groupings of nozzle means: no nozzle means, the bottom nozzle means only, the middle nozzle means only, the bottom and middle nozzle means only, the middle and top nozzle means only, or all nozzles.

39. A method for controlling an orchard sprayer of the type having a plurality of separately controllable material application means, each of which have a determinable application pattern which differs from that of the others, said method comprising the steps of:
determining said application patterns of said plurality of material application means;
transporting the orchard sprayer along a row of target trees in an orchard;
making a scan of a given vertically-oriented sector of such row of target trees to determine the relative size and vertical location of a target load centroid in such given sector;
determining the distance between the target load centroid of the given vertically-oriented sector and the plurality of material application means of the orchard sprayer; and
selectively actuating each of the material application means, as they are subsequently transported past the given sector, for optimal material application to the sensed load centroid in such given sector, such actuation being based on the spatial relationship between spatial characteristics of such centroid and the determined respective application patterns of the plurality of material application means, wherein the spatial characteristics of a given load centroid are defined by the respective size, location, and distance determinations thereof.

* * * * *